US009460075B2

(12) United States Patent
Mungi et al.

(10) Patent No.: US 9,460,075 B2
(45) Date of Patent: *Oct. 4, 2016

(54) SOLVING AND ANSWERING ARITHMETIC AND ALGEBRAIC PROBLEMS USING NATURAL LANGUAGE PROCESSING

(71) Applicant: International Business Machines Corporation, Armonk, NY (US)

(72) Inventors: Ashish Mungi, Bangalore (IN); Joy Mustafi, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/306,267

(22) Filed: Jun. 17, 2014

(65) Prior Publication Data

US 2015/0363390 A1 Dec. 17, 2015

(51) Int. Cl.
*G06F 17/27* (2006.01)

(52) U.S. Cl.
CPC .................................. *G06F 17/271* (2013.01)

(58) Field of Classification Search
CPC .................................................... G06F 17/274
USPC .............................................................. 704/9
See application file for complete search history.

(56) References Cited

U.S. PATENT DOCUMENTS

| | | | |
|---|---|---|---|
| 5,442,780 A | 8/1995 | Takanashi et al. | |
| 5,995,659 A | 11/1999 | Chakraborty et al. | |
| 7,792,829 B2 | 9/2010 | Brill et al. | |
| 8,275,803 B2 | 9/2012 | Brown et al. | |
| 8,332,394 B2 | 12/2012 | Fan et al. | |
| 8,364,488 B2 | 1/2013 | Kurzweil et al. | |

(Continued)

FOREIGN PATENT DOCUMENTS

| | | |
|---|---|---|
| JP | 2012141910 A | 7/2012 |
| WO | 2006042028 A2 | 4/2006 |
| WO | 2009140473 A1 | 11/2009 |

OTHER PUBLICATIONS

Dumais et al, "Web Question Answering: Is More Always Better?," SIGIR'02, Aug. 11-15, 2002, ACM, Tampere, Finland.

(Continued)

*Primary Examiner* — Tammy Pham
*Assistant Examiner* — Bharatkumar Shah
(74) *Attorney, Agent, or Firm* — Patricia B. Feighan

(57) ABSTRACT

A computer system for solving and answering an arithmetic or algebraic problem using natural language processing (NLP) is provided. The computer system may include receiving an input statement associated with the arithmetic or algebraic problem. The computer system may also include determining whether each sentence within a plurality of sentences associated with the input statement is a well-formed sentence from a mathematical perspective. The computer system may further include converting each statement into a well-formed sentence based on the determining whether each sentence within a plurality of sentences associated with the input statement is a well-formed sentence from a mathematical perspective. Additionally, the computer system may include converting each well-formed sentence into a mathematical equation to form a set of equations. Also, the computer system may include solving the set of equations to compute a mathematical result. The computer system may include narrating the mathematical result in natural language.

6 Claims, 15 Drawing Sheets

(56) References Cited

U.S. PATENT DOCUMENTS

| | | | |
|---|---|---|---|
| 8,538,744 | B2 | 9/2013 | Roberts et al. |
| 8,655,866 | B1 | 2/2014 | Provine et al. |
| 8,700,620 | B1* | 4/2014 | Lieberman ........ G06F 17/30731 707/728 |
| 2003/0115192 | A1 | 6/2003 | Kil et al. |
| 2004/0253569 | A1 | 12/2004 | Deane et al. |
| 2005/0080614 | A1* | 4/2005 | Bennett .................... G06F 17/27 704/9 |
| 2006/0036512 | A1 | 2/2006 | Maccarthy et al. |
| 2006/0173834 | A1 | 8/2006 | Brill et al. |
| 2008/0097748 | A1 | 4/2008 | Haley et al. |
| 2009/0112787 | A1 | 4/2009 | Ginzberg |
| 2009/0287678 | A1 | 11/2009 | Brown et al. |
| 2010/0077032 | A1 | 3/2010 | Drennan et al. |
| 2011/0153312 | A1 | 6/2011 | Roberts |
| 2011/0307435 | A1* | 12/2011 | Overell ................. G06F 17/278 706/46 |
| 2013/0007033 | A1 | 1/2013 | Brown et al. |
| 2013/0013615 | A1 | 1/2013 | Brown et al. |
| 2013/0024487 | A1 | 1/2013 | Yi |
| 2013/0031082 | A1 | 1/2013 | Wolfram et al. |
| 2013/0226562 | A1* | 8/2013 | Arnon ............... G06F 17/30831 704/9 |
| 2013/0226846 | A1 | 8/2013 | Li et al. |
| 2013/0262501 | A1 | 10/2013 | Kuchmann-Beauger et al. |
| 2013/0275122 | A1 | 10/2013 | Park et al. |
| 2014/0040312 | A1 | 2/2014 | Gorman et al. |
| 2014/0075410 | A1 | 3/2014 | Wolfram |
| 2014/0229497 | A1 | 8/2014 | Wolfram et al. |
| 2014/0250130 | A1* | 9/2014 | Stockton ........... G06F 17/30616 707/741 |
| 2014/0258817 | A1 | 9/2014 | Carrier et al. |
| 2014/0280256 | A1 | 9/2014 | Wolfram et al. |
| 2014/0316768 | A1 | 10/2014 | Khandekar |
| 2015/0019946 | A1 | 1/2015 | Zarras |
| 2015/0324413 | A1 | 11/2015 | Gubin et al. |
| 2015/0331846 | A1 | 11/2015 | Guggilla et al. |

OTHER PUBLICATIONS

Finkel et al, "Stanford Named Entity Recognizer (NER)," The Stanford Natural Language Processing Group, Last Updated Jan. 4, 2014, p. 1-4, Version 3.3.1, http://nlp.stanford.edu/software/CRF-NER.shtml, Accessed on Jun. 3, 2014.

Liu et al, "Using Stranger as Sensors: Temporal and Geo-sensitive Question Answering via Social Media," International World Wide Web Conference Committee, May 13-17, 2013, WWW 2013, ACM, Rio de Janiero, Brazil.

Moldovan et al, "Temporally Relevant Answer Selection," Language Computer Corporation, Richardson, Texas.

Mungi et al, "Answering Time-Sensitive Questions," filed Aug. 7, 2014, p. 1-43, U.S. Appl. No. 14/453,891.

Sanampudi et al, "A Question Answering System Supporting Temporal Queries," ICAC3, 2013, p. 207-214, CCIS 361, Springer-Verlag, Berlin Heidelberg.

Sanampudi et al, "Temporal Reasoning in Natural Language Processing: A Survey," International Journal of Computer Applications, 2010, p. 68-72, vol. 1, No. 4.

Saquete et al, "Splitting Complex Temporal Questions for Question Answering systems," Departamento de Lenguajes y Sistemas Informaticos, Universidad de Alicante, Alicante, Spain.

Wikipedia, "Named-entity recognition," Last Modified on May 13, 2014, p. 1-5, Wikipedia: the Free Encyclopedia, http://en.wikipedia.org/wiki/Named-entity_recognition, Accessed on Jun. 3, 2014.

Wikipedia, "Phrase chunking," Last Modified on Sep. 26, 2013, p. 1, Wikipedia: the Free Encyclopedia, http://en.wikipedia.org/wiki/Phrase_chunking, Accessed on Jun. 3, 2014.

Bergstein, "Intelligent Solutions, Your Brain, Analytical Thinking," Wolters Kluwer Solutions, Oct. 3, 2011, p. 1, http://solutions.wolterskluwer.com/blog/2011/10/intelligent-solutions-your-brain-analytical-thinking/, Accessed on Sep. 8, 2014.

Bhat et al., "Automatic Data Interpretation and Answering Analytical Questions With Tables and Charts," filed Sep. 17, 2014, p. 1-36, U.S. Appl. No. 14/488,908.

Demir et al., "Interactive Sight into Information Graphics," W4A2010 Technical, Apr. 26-27, 2010, ACM, Raleigh.

IBM, "IBM Exploratory Computer Vision," IBM Research, Last Updated Sep. 7, 2013, p. 1, http://researcher.watson.ibm.com/researcher/view_group.php?id=1903, Accessed on Sep. 8, 2014.

IBM, "IBM i2 Text Chart," IBM Software White Paper, Nov. 2012, p. 1-11, IBM Corporation.

India Bix, "Bar Charts—Data Interpretation Questions and Answers," 2014 IndiaBix Technologies, p. 1-2, http://www.indiabix.com/data-interpretation/bar-charts/, Accessed on Sep. 8, 2014.

India Bix, "Line Charts—Data Interpretation Questions and Answers," 2014 IndiaBix Technologies, p. 1-2, http://www.indiabix.com/data-interpretation/line-charts/, Accessed on Sep. 8, 2014.

India Bix, "Pie Charts—Data Interpretation Questions and Answers," 2014 IndiaBix Technologies, p. 1-2, http://www.indiabix.com/data-interpretation/pie-charts/, Accessed on Sep. 8, 2014.

India Bix, "Table Charts—Data Interpretation Questions and Answers," 2014 IndiaBix Technologies, p. 1, http://www.indiabix.com/data-interpretation/table-charts/, Accessed on Sep. 8, 2014.

Kerr, "SAT Tip of the Week: 4 Tips to Solve Pie Chart Questions," Veritas Prep, Posted on Sep. 18, 2013, p. 1-2, Veritas, LLC, http://www.veritasprep.com/blog/2013/09/sat-tip-of-the-week-4-tips-to-solve-pie-chart-questions/, Accessed on Sep. 8, 2014.

Pinto et al., "Table Extraction Using Conditional Random Fields," SIGIr'03, Jul. 28-Aug. 1, 2003, p. 235-242, ACM, Toronto, Canada.

Tengli et al., "Learning Table Extraction from Examples," School of Computer Science, Carnegie Mellon University, Pittsburgh, PA.

Wayne State University, "Analytical & Problem Solving Skills," Wayne LEADS, p. 1-2, http://hr.wayne.edu/leads/resource-guide/analytical-skills.php, Accessed on Sep. 8, 2014.

Wei et al., "Answer Retrieval From Extracted Tables," Center for Intelligent Information Retrieval, University of Massachusetts Amherst, Amherst, MA.

Wei et al., "Table Extraction for Answer Retrieval," Center for Intelligent Information Retrieval, p. 1-26, University of Massachusetts Amherst, Amherst, MA.

Çakiroglu, "Can Computer Understand and Solve Turkish Arithmetic Problems?," World Applied Sciences Journal, 2008, p. 311-317, vol. 5, Issue 3, IDOSI Publications.

Carasco, "Free math problem solver," Basic-mathematics.com, p. 1-3, http://www.basic.mathematics.com/free-math-problem-solver.html, Accessed on May 8, 2014.

Chudov, "Algebra Homework Help—People's Math!," Algebra Homework Help, Algebra Solvers, Free Math Tutors, p. 1-3, http://www.algebra.com/, Accessed on May 8, 2014.

CMU, "Parse a sentence," Link Grammar, p. 1, Carnegie Mellon University, http://www.link.cs.cmu.edu/link/submit-sentence-4.html, Accessed on May 8, 2014.

Cornell, "What is Anaphora Resolution?," 2000, p. 1, http://www.cs.cornell.edu/boom/2000sp/2000%20projects/anaphora/definition.html, Accessed on May 8, 2014.

Deane et al, "Automatic Item Generation via Frame Semantics: Natural Language Generation of Math Word Problems," Educational Testing Service, 2003, p. 1-26.

Filloy et al, "Arithmetic/Algebraic Problem-Solving and the Representation of Two Unknown Quantities," Proceedings of the 28th Conference of the International Group for the Psychology of Mathematics Education, 2004, p. 391-398, vol. 2, PME28, Cinvestav, Mexico.

Gelb, "Experiments with a Natural Language Problem-Solving System," Computer Understanding I (Communication), p. 455-462, Session No. 10, IBM Corporation, Systems Development Division, Poughkeepsie, New York.

Google, "Calculator and unit converter," Search Help, p. 1-2, https://support.google.com/websearch/answer/3284611?hl=en, Accessed on May 8, 2014.

(56) References Cited

OTHER PUBLICATIONS

Gray, "Research on the Problem of Translating Natural Language Sentences into Algebra," The Mathematics Editor, p. 41-43, vol. 6, No. 2.
Hinsley et al, "From Words to Equations Meaning and Representation in Algebra Word Problems," Cognitive Processes in Comprehension, 1977, p. 89-106, Chapter 4. Algebra Word Problems, Lawrence Erlbaum Associates, Hillsdale, NJ.
Kraf et al, "Syntactic ambiguity," Linguistics Online, p. 1, http://languagelink.let.uu.nl/~lion/?s=Grammar_exercises/grammar_4, Accessed on May 8, 2014.
Liguda et al, "Modeling Math Word Problems with Augmented Semantic Networks," NLDB, 2012, p. 247-252, LNCS 7337, Springer-Verlag Berlin Heidelberg.
MacCartney et al, "Stanford Dependencies," The Stanford Natural Language Processing Group, p. 1-3, http://nlp.stanford.edu/software/stanford-dependencies.shtml, Accessed on May 8, 2014.
Marcus et al, "The Penn Treebank Project," Computer and Information Science Department at the University of Pennsylvania, Last Change: Feb. 2, 1999, p. 1-2, http://www.cis.upenn.edu/~treebank/, Accessed on May 8, 2014.
Morton et al, "A Novel Framework for Math Word Problem Solving," International Journal of Information and Education Technology, Feb. 2013, p. 88-93, vol. 3, No. 1.
Online Math Learning, "How to solve Algebra Word Problems?," p. 1-5, http://www.onlinemathlearning.com/algebra-word-problems.html, Accessed on May 8, 2014.
Petrov, "Online Math Problem Solver," Math10, p. 1-2, http://www.math10.com/en/problem-solver/, Accessed on May 8, 2014.
Raphael, "Research on Intelligent Question-Answering Systems," The Clearinghouse for Federal Scientific and Technical Information, Period Covered: Apr. 15, 1966 through May 14, 1968, SRI Project 6001, Stanford Research Institute, Menlo Park, California.
Sarmiento et al, "Co-constructed Narratives in Online, Collaborative Mathematics Problem-Solving," Virtual Math Teams Project, p. 1-8, The Math Forum @ Drexel University, Philadelphia, PA.
Singh et al, "Automatically Generating Algebra Problems," Association for the Advancement of Artificial Intelligence, 2012, Microsoft Research.
Stanford, "Stanford Parser," Stanford NLP, Last updated Jul. 10, 2012, p. 1, http://nlp.stanford.edu:8080/parser/, Accessed on May 8, 2014.
Tseng et al, "On mapping natural language constructs into relational algebra through E-R representation," Republic of China National Science Council, p. 1-31, Hsinchu, Taiwan, ROC.
Webmath, "Welcome to Webmath!," WebMath—Solve Your Math Problem, p. 1-2, Discovery Education, http://www.webmath.com/index.html, Accessed on May 8, 2014.
Wikipedia, "Morphological analysis," Last Modified on Nov. 2, 2013, p. 1, Wikipedia: the Free Encyclopedia, http://en.wikipedia.org/wiki/Morphological_analysis, Accessed on May 8, 2014.
IBM, "List of IBM Patents or Patent Applications Treated as Related (Appendix P)," Apr. 9, 2015.
Mungi et al., "Solving and Answering Arithmetic Algegraic Problems Using Natural Language Processing," filed Aug. 29, 2014, p. 1-44, U.S. Appl. No. 14/472,554.
Mungi et al., "Answering Time-Sensitive Questions," filed Aug. 7, 2014, p. 1-43, U.S. Appl. No. 14/453,891.
Bhat et al., "Automatic Data Interpretation and Answering Analytical Questions With Tables and Charts," filed Apr. 8, 2015, p. 1-34, U.S. Appl. No. 14/681,594.
List of IBM Patents Applications Treateed as Related (Appendix P), Sep. 23, 2014.
Mungi et al., "Solving and Answering Arithmetic and Algebraic Problems Using Natural Language Processing," filed Aug. 29, 2014, p. 1-44, U.S. Appl. No. 14/472,554.

\* cited by examiner

200

| 202 | 204 | 206 | 208 |
|---|---|---|---|
| Verb / Action Word | Correlated Mathematical Operator(s) | Operates on: Subject(s) | Operates On: Object(s) |
| give(s) / gave | Add(+) Subtract(-) | Subtract(-) | Add(+) |
| take(s) / took | Add(+) Subtract(-) | Add(+) | Subtract(-) |
| distribute(s) / distributed | Subtract(-) Divide(/) | Subtract(-) | Divide(/) |
| has / had / have | Equal (=) | Equal (=) | Equal (=) |
| equals / left with / remaining | Equal (=) | Equal (=) | Equal (=) |
| is / be | Equal (=) | Equal (=) | Equal (=) |

210

| Coefficients / Numerals / Qualifier | Correlated Mathematical Operator(s) | Operates on: Subject(s) | Operates On: Object(s) |
|---|---|---|---|
| Coefficient / Numeral / Number | Multiply ( * ) | Multiply ( * ) (Depends on context) | Multiply ( * ) (Depends on context) |
| times / number of times | Multiply ( * ) | Multiply ( * ) (Depends on context) | Multiply ( * ) (Depends on context) |

Dictionary 114

| 10) WELL-FORMED SENTENCE | 11) POS TAGGING | 12) PARSING / PARSE TREE GENERATION | 13) TYPED DEPENDENCIES | 14) MAP VARIABLES FROM TYPED DEPENDENCIES | 15) LOOKUP PROPOSED DICTIONARY #1 FOR VERB-OPERATOR MAPPING | 16) CONSTRUCT EQUATION(S) |
|---|---|---|---|---|---|---|
| Ashish had 2 apples. | Ashish/NNP had/VBD 2/CD apples/NNS ./. | (ROOT (S (NP (NNP Ashish)) (VP (VBD had) (NP (CD 2) (NNS apples))) (. .))) | nsubj(had-2, Ashish-1) root(ROOT-0, had-2) num(apples-4, 2-3) dobj(had-2, apples-4) | NSUBJ1 = Ashish NUM1 = 2 DOBJ1 = Apples | VERB: had OPERATOR (Sub): = NUMBER: 2 OPERATOR (Obj): * | NSUBJ1 = 2 * DOBJ1 |
| Ashish gave 1 apple to Joy. | Ashish/NNP gave/VBD 1/CD apple/NN to/TO Joy/NNP ./. | (ROOT (S (NP (NNP Ashish)) (VP (VBD gave) (NP (CD 1) (NN apple)) (PP (TO to) (NP (NNP Joy)))) (. .))) | nsubj(gave-2, Ashish-1) root(ROOT-0, gave-2) num(apple-4, 1-3) dobj(gave-2, apple-4) prep(gave-2, to-5) pobj(to-5, Joy-6) | NSUBJ1 = Ashish NUM2 = 1 DOBJ1 = Apples POBJ1 = Joy OPS1 = gave | VERB: gave OPERATOR (Sub): - OPERATOR (Obj): + NUMBER: 1 OPERATOR (Obj): * | NSUBJ1 = NSUBJ1 - 1 * DOBJ1 POBJ1 = POBJ1 + 1 * DOBJ1 |
| How many apples are left with Ashish? | How/WRB many/JJ apples/NNS are/VBP left/VBN with/IN Ashish/NNP ?/. | (ROOT (SBARQ (WHADVP (WRB How) (JJ many) (NNS apples)) (SQ (VBP are) (VP (VBN left) (PP (IN with) (NP (NNP Ashish))))) (. ?))) | advmod(many-2, How-1) amod(apples-3, many-2) nsubjpass(left-5, apples-3) auxpass(left-5, are-4) root(ROOT-0, left-5) prep(left-5, with-6) pobj(with-6, Ashish-7) | NSUBJ1 = Ashish DOBJ1 = Apples | VERB: left (with) OPERATOR (Sub): = OPERATOR (Obj): = | ** Question / Equations to be solved in terms of NSUBJ1 and DOBJ1 ** |

FIG. 9B

SOLVING AND ANSWERING ARITHMETIC AND ALGEBRAIC PROBLEMS USING NATURAL LANGUAGE PROCESSING

FIELD OF THE INVENTION

The present invention relates generally to the field of computing, and more particularly to solving arithmetic and algebraic problems.

BACKGROUND

There are several types of arithmetic and algebraic problems which are typically described in natural language through a number of factoid sentences and one or more questions. The questions may be interrogative queries, such as Who, What, How many, etc. The arithmetic and algebraic problems may also be described through deterministic words such as "Find the number of . . . ". Such arithmetic and algebraic problems typically depend on people (e.g., tutors or teachers) to solve the word problems posed by students or users. Additionally, such arithmetic and algebraic problems may also be solved via "interactive" screens which use pre-computed logic and value or provide textual explanation to a pre-specified math problem. Furthermore, a video may be utilized where a person or tutor explains the logic and the solution to a pre-specified math problem.

SUMMARY

According to one embodiment, a method for solving and answering an arithmetic or algebraic problem using natural language processing (NLP) is provided. The method may include receiving an input statement associated with the arithmetic or algebraic problem. The method may also include determining whether each sentence within a plurality of sentences associated with the input statement is a well-formed sentence from a mathematical perspective. The method may further include converting each statement into a well-formed sentence based on the determining whether each sentence within a plurality of sentences associated with the input statement is a well-formed sentence from a mathematical perspective. Additionally, the method may include converting each well-formed sentence into a mathematical equation to form a set of equations. Also, the method may include solving the set of equations to compute a mathematical result. The method may include narrating the mathematical result in natural language.

According to another embodiment, a computer system for solving and answering an arithmetic or algebraic problem using natural language processing (NLP) is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving an input statement associated with the arithmetic or algebraic problem. The method may also include determining whether each sentence within a plurality of sentences associated with the input statement is a well-formed sentence from a mathematical perspective. The method may further include converting each statement into a well-formed sentence based on the determining whether each sentence within a plurality of sentences associated with the input statement is a well-formed sentence from a mathematical perspective. Additionally, the method may include converting each well-formed sentence into a mathematical equation to form a set of equations. Also, the method may include solving the set of equations to compute a mathematical result. The method may include narrating the mathematical result in natural language.

According to yet another embodiment, a computer program product for solving and answering an arithmetic or algebraic problem using natural language processing (NLP) is provided. The computer program product may include one or more computer-readable storage devices and program instructions stored on at least one of the one or more tangible storage devices, the program instructions executable by a processor. The computer program product may also include program instructions to retrieve an input statement associated with the arithmetic or algebraic problem. The computer program product may also include program instructions to determine whether each sentence within a plurality of sentences associated with the input statement is a well-formed sentence from a mathematical perspective. The computer program product may further include program instructions to convert each statement into a well-formed sentence based on the determining whether each sentence within a plurality of sentences associated with the input statement is a well-formed sentence from a mathematical perspective. Additionally, the computer program product may include program instructions to convert each well-formed sentence into a mathematical equation to form a set of equations. Also, the computer program product may include program instructions to solve the set of equations to compute a mathematical result. The computer program product may include program instructions to narrate the mathematical result in natural language.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 illustrates an exemplary dictionary containing a mapping of verbs and mathematical operators according to one embodiment;

FIGS. 9A-9B illustrate examples solving a math problem using the described algorithms in FIGS. 3-8 according to one embodiment;

DETAILED DESCRIPTION

Figure 1:
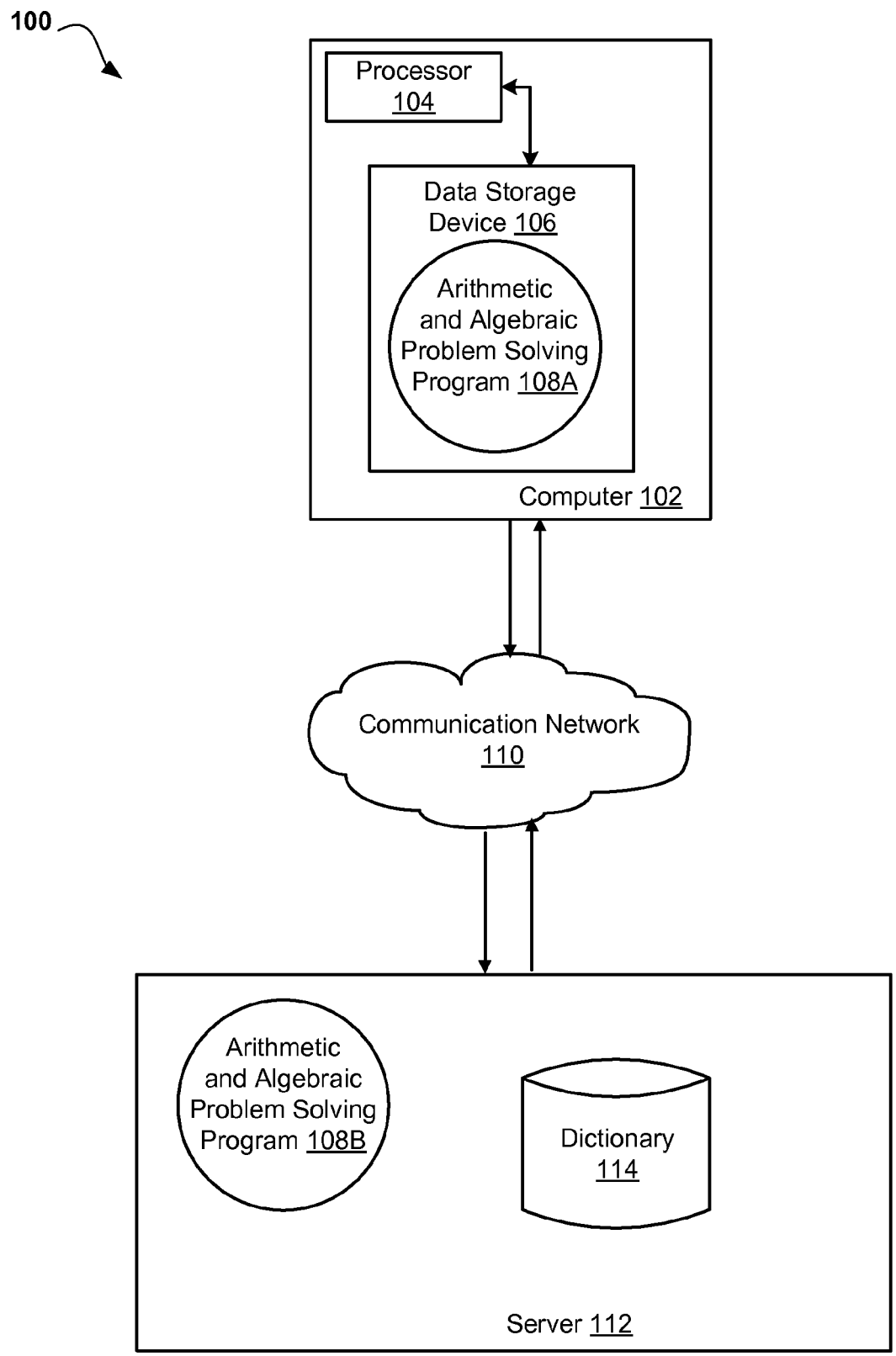
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to solving arithmetic and algebraic problems. The following described exemplary embodiments provide a system, method and program product for solving arithmetic and algebraic problems using natural language processing (NLP).

As previously explained, there are several types of arithmetic and algebraic problems which are typically described in natural language through a number of factoid sentences and one or more questions. Such arithmetic and algebraic problems typically depend on people to solve the word problems posed by students or users. Additionally, such arithmetic and algebraic problems may also be solved via "interactive" screens or a video where a person or tutor explains the logic and the solution to a pre-specified math problem. Additionally, a calculator tool may be utilized if a basic arithmetic equation, such as (2+2) is entered in the search bar. However, currently there are no existing solutions or computer applications or systems which can automatically solve such arithmetic or algebraic math problems in real-time using natural language processing (NLP). Therefore, it may be advantageous, among other things, to solve arithmetic or algebraic math problems through a question-answer system which may understand natural language as well as provide natural language answers. As such, the present embodiment may allow a user to enter a math problem in natural language and the user may receive an automatic interactive response or solution from the computer in real-time.

According to at least one embodiment, a computer-based question-answer system may understand an arithmetic or algebraic math problem stated in natural language and provide an answer or solution in real-time as a natural language answer. One implementation of the present embodiment may receive an input problem statement and question to be answered (from a data source or user interface) and determine whether the original sentences are well-formed from a mathematical perspective. Then, if required, the method may convert the input sentences to a sequence of sentences which are well-formed from a mathematical perspective and convert the well-formed sentences into mathematical equations. The present embodiment may also solve the set of equations using applicable logic or mathematical methods to get a mathematical result. The present embodiment may also correlate the mathematical result to the original question to be answered and then narrate the mathematical result in natural language, as an answer to the original question.

Additionally, according to at least one implementation, the present embodiment may also include a dictionary which may contain a mapping between verbs or action words and mathematical operators, such that for each verb or action word, the effect of the mathematical operator on the operands (subject(s) and the object(s) of a sentence) may be specified in the dictionary. This dictionary may be created, updated, and/or maintained as a separate entity.

Also, the present embodiment may be generic and may be used by a computer-based question-answer system to solve a diverse set of arithmetic or algebraic mathematical problems in natural language and in real-time. Furthermore, the present embodiment may be used for any natural language supported by natural language processing algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for solving arithmetic and algebraic problems using natural language processing (NLP). As previously described, there may be different types of arithmetic or algebraic mathematical problems which may be stated in natural language. Such "math problem statements" may be commonly used in academia and text books as an aid to teaching mathematical concepts and provide practical exposure to students and readers through "student exercises". The problem statements may also be used to describe practical problems encountered in industry. Examples of such math problems include, but are not limited to the following:

Age Problems usually compare the ages of people. They may involve a single person, comparing his/her age in the past, present or future. They may also compare the ages involving more than one person.

Average Problems involve the computations for arithmetic mean, weighted average of different quantities, average speed computation, etc.

Coin/Stamp/Ticket Problems deal with items with denominated values.

Consecutive Integer Problems deal with consecutive numbers. The number sequences may be Even or Odd, or some other simple number sequences.

Digit Problems involve the relationship and manipulation of digits in numbers.

Distance Problems involve the calculation of distance an object travels given the total time, or the travel rate over a period of time, including objects that Travel at Different Rates or objects that Travel in Different Directions, etc.

Fraction Problems involve fractions or parts of a whole.

Geometry Word Problems deal with geometric figures and angles described in words, including word problems Involving Perimeters, Involving Areas and Involving Angles.

Integer Problems involve numerical representations of word problems, involving 1 unknown, 2 unknowns or more than 2 unknowns.

Interest Problems involve calculations of simple interest.

Lever Problems deal with the lever principle described in word problems, involving 2 or more objects.

Mixture Problems involve items or quantities of different values that are mixed together. This involve Adding to a Solution, Removing from a Solution, Replacing a Solution, or Mixing Items of Different Values.

Motion Word Problems are word problems that use the distance, rate and time formula.

Number Sequence Problems use number sequences in the construction of word problems, including finding the value of a particular term or the pattern of a sequence, etc.

Proportion Problems involve proportional and inversely proportional relationships of various quantities.

Ratio Problems require relating quantities of different items in certain known ratios, or work out the ratios given certain quantities. This could be Two-Term Ratios or Three-Term Ratios, etc.

Variation Word Problems may consist of Direct Variation Problems, Inverse Variation Problems or Joint Variation Problems.

Work Problems involve different people doing work together at different rates such as Two Persons, More Than Two Persons or Pipes Filling up a Tank, etc.

Additionally, implementations of the present embodiment may include utilizing existing technology, including, but not limited to the following:

Parsing/Syntactic Analysis:

Parsing or Syntactic Analysis is the process of analyzing a string of symbols, either in natural language or in computer languages, according to the rules of a formal grammar. For example, Stanford Parser—http://nlp.stanford.edu:8080/parser/or Carnegie Mellon University Parser: http://www.link.cs.cmu.edu/link/submit-sentence-4.html.

POS Tagging:

In corpus linguistics, Part-Of-Speech Tagging (POS tagging or POST), also called grammatical tagging, is the process of marking up a word in a text (corpus) as corresponding to a particular part of speech, based on both its definition, as well as its context—i.e. relationship with adjacent and related words in a phrase, sentence, or paragraph. For example, University of Pennsylvania—Penn Tree Bank: http://www.cis.upenn.edu/~treebank/.

Typed Dependency Analysis:

A representation of grammatical relations between words in a sentence. They have been designed to be easily understood and effectively used by people who want to extract textual relations. In general, dependencies are triplets: name of the relation, governor and dependent. For example, The Stanford Natural Language Processing Group-Typed Dependencies: http://nlp.stanford.edu/software/stanforddependencies.shtml.

Structural/Syntactic Ambiguity:

Syntactic ambiguity is a property of sentences which may be reasonably interpreted in more than one way, or reasonably interpreted to mean more than one thing. Ambiguity may or may not involve one word having two parts of speech or homonyms. Syntactic ambiguity arises not from the range of meanings of single words, but from the relationship between the words and clauses of a sentence, and the sentence structure implied thereby. When a reader can reasonably interpret the same sentence as having more than one possible structure, the text is equivocal and meets the definition of syntactic ambiguity. For example, Linguistics Online—Syntactic Ambiguity: http://languagelink.letuu.nl/~lion/?s=Grammar_exercises/grammar_4.

Anaphora Resolution:

In linguistics, an anaphora is a type of expression whose reference depends upon another referential element. It is co-referential with the expression in subject position. An anaphoric expression is represented by a pro-form or some other kind of deictic, for instance, a pronoun referring to its antecedent. For example, Cornell University—Anaphora: http://www.cs.cornell.edu/boom/2000sp/2000%20projects/anaphora/definition.html.

Morphological Analysis:

In linguistics, morphology is the identification, analysis and description of the structure of a given language's morphemes and other linguistic units, such as root words, affixes, parts of speech, intonation/stress, or implied context (words in a lexicon are the subject matter of lexicology). Morphological typology represents a method for classifying languages according to the ways by which morphemes are used in a language. For example, Wikipedia: http://en.wikipedia.org/wiki/Morphological_analysis.

Referring now to FIG. 1, an exemplary networked computer environment 100 in accordance with one embodiment is depicted. The networked computer environment 100 may include a computer 102 with a processor 104 and a data storage device 106 that is enabled to run an Arithmetic and Algebraic Problem Solving Program 108A. The networked computer environment 100 may also include a server 112 that is enabled to run an Arithmetic and Algebraic Problem Solving Program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. The network computer environment may also include a dictionary 114 which may contain a mapping between verbs or action words and mathematical operators, such that for each verb or action word, the effect of the mathematical operator on the operands (subject(s) and the object(s) of a sentence) may be specified in the dictionary. According to at least one implementation, the dictionary 114 may be created, updated, and maintained as a separate entity. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 10, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as an Arithmetic and Algebraic Problem Solving Program 108A and 108B may run on the client computer 102 or on the server computer 112. The Arithmetic and Algebraic Problem Solving Program 108A, 108B may be utilized to solve arithmetic and algebraic problems. For example, a user using an Arithmetic and Algebraic Problem Solving Program 108A, running on a client computer 102, may connect via a communication network 110 to server computer 112, which may also be running an Arithmetic and Algebraic Problem Solving Program 108B. Furthermore, the user using client computer 102 or server 112 may utilize the Arithmetic and Algebraic Problem Solving Program 108A, 108B to solve a diverse set of arithmetic or algebraic mathematical problems in natural language and in real-time. The Arithmetic and Algebraic Problem Solving is explained in further detail below with respect to FIGS. 3-8.

Referring now to FIG. 2, an exemplary dictionary 200 containing a mapping of verbs and mathematical operators in accordance with one embodiment is depicted. According to at least one implementation, the present embodiment may include a dictionary 114 containing a mapping between verbs 202 or action words 202 and mathematical operators 204. As such, for each verb 202 or action word 202, the effect of the mathematical operator 204 on the operands (subject(s) 206 and the object(s) 208) may be specified in the dictionary 114. Typically, coefficients or numerals 210 in a sentence act as multipliers with the object(s) 208 or subject(s) 206 to which they refer. This may depend on the context, and may be determined through natural language processing (NLP) parsing and determination of typed dependencies.

A sample mapping of certain verbs 202 and typical mathematical operators 204, such as "add", "subtract", "multiply", "divide", "equals" (e.g., (+ − * / =)) is illustrated in FIG. 2 and may be included in the dictionary 114. According to the present embodiment, the mapping may be used in a generic way to resolve how an operator 204 may operate on a subject 206 or object 208 in a given sentence containing a specific verb or action word.

Figure 3A:
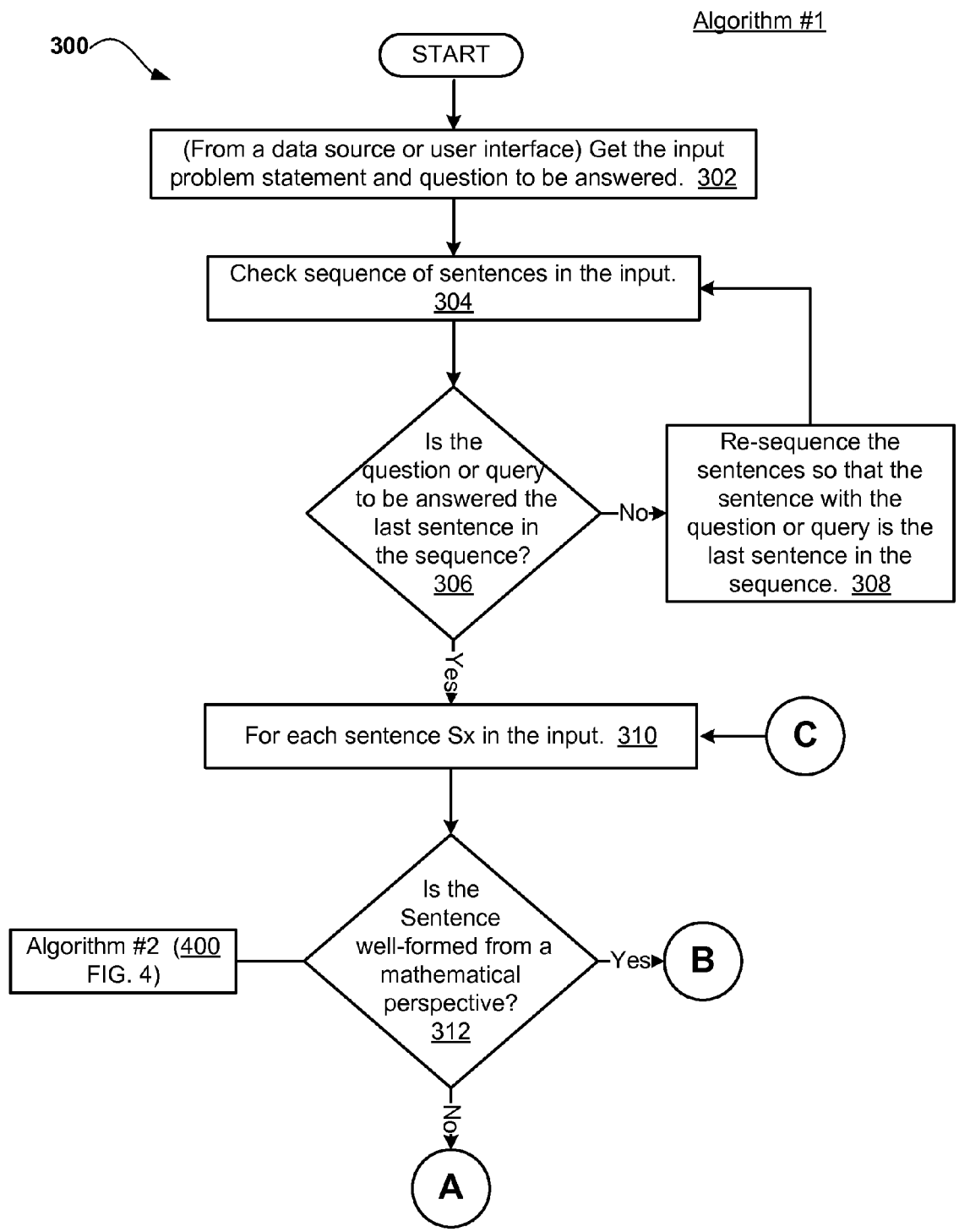
FIGS. 3A-3B is an operational flowchart illustrating an overall algorithm for answering arithmetic and algebraic problems using natural language according to one embodiment.
Figure 3B:
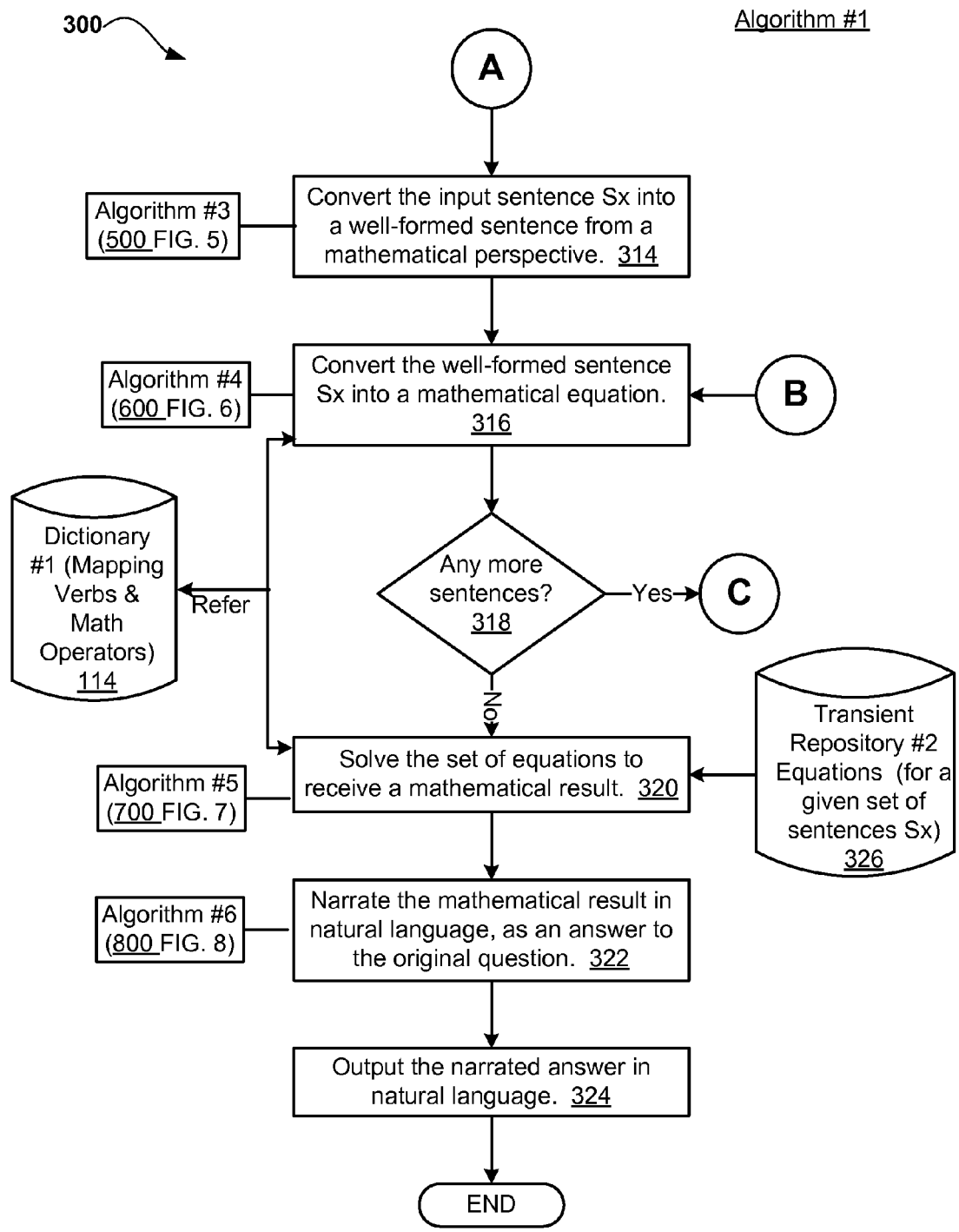

Referring now to FIGS. 3A-3B, an operational flowchart 300 illustrating an overall algorithm (i.e., algorithm #1) for answering arithmetic and algebraic problems using natural language in accordance with one embodiment is depicted. At 302, the method may get the input problem statement and question to be answered from a data source or user interface. For example, an input statement may be a statement such as, ("Ashish had 2 apples. He gave one to Joy. How many are left?").

Then at 304, the sequence of sentences in the input statement may be checked. As such, the sequence of the sentences of the input statement may be examined to determine the order of the sentences. Next at 306, it is determined whether the question or query to be answered is the last sentence in the sequence. If at 306, it is determined that the question or query to be answered is not the last sentence in the sequence, then at 308, the method may re-sequence the sentences so that the sentence with the question or query is the last sentence in the sequence. Then the method may continue back to step 304 (previously explained) to check the sequence of sentences in the input.

However, if at 306, it is determined that the question or query to be answered is the last sentence in the sequence, then at 310, for each sentence (Sx) in the input, the method may perform steps 312-324 described below.

At 312, it is determined whether the sentence is well-formed from a mathematical perspective. As such, according to one implementation, the method may base the determination as to whether the sentence is well-formed formed from a mathematical perspective, on algorithm #2 (400 (FIG. 4)) explained in detail below.

If at 312, it is determined that the sentence is not well-formed from a mathematical perspective, then at 314, the method may convert the input sentence (Sx) into a well-formed sentence from a mathematical perspective. As such, according to one implementation, the method may convert the input sentence (Sx) into a well-formed sentence from a mathematical perspective by utilizing algorithm #3 (500 (FIG. 5)) explained in detail below. Then the method may continue to step 316 to convert the well-formed sentence (Sx) into a mathematical equation.

However, if at 312, it is determined that the sentence is well-formed from a mathematical perspective, then at 316 the method may convert the well-formed sentence (Sx) into a mathematical equation. According to one implementation, the method may convert the well-formed sentence (Sx) into a mathematical equation by utilizing algorithm #4 (600 (FIG. 6)) explained in detail below and by referring to the (Dictionary #1) 114 which maps verbs and math operators.

Then at 318, it is determined whether there are any more sentences to evaluate. If at 318 it is determined that there are more sentences to evaluate, then the method may continue back to step 310 previously described.

However, if at 318 it is determined that there are not any more sentences to evaluate, then at 320 the method may solve the set of equations to compute a mathematical result. According to one implementation the method may refer to the (Dictionary #1) 114 which may map verbs and math operators. Additionally, the method may receive the set of equations from the (Transient Repository #2) 326 which is the repository of equations for a given set of sentences (Sx). Furthermore, the method may solve the set of equations to compute a mathematical result by utilizing algorithm #5 (700 (FIG. 7)) explained in detail below.

Next at 322, the mathematical result is narrated in natural language as an answer to the original question. According to one implementation, the method may utilizing algorithm #6 (800 (FIG. 8)) explained in detail below to narrate the mathematical result in natural language as an answer to the original question. Then at 324, the method may output the narrated answer in natural language. For example, a narrated answer in natural language may be an answer such as, ("Ashish has 1 apple left").

Figure 4A:
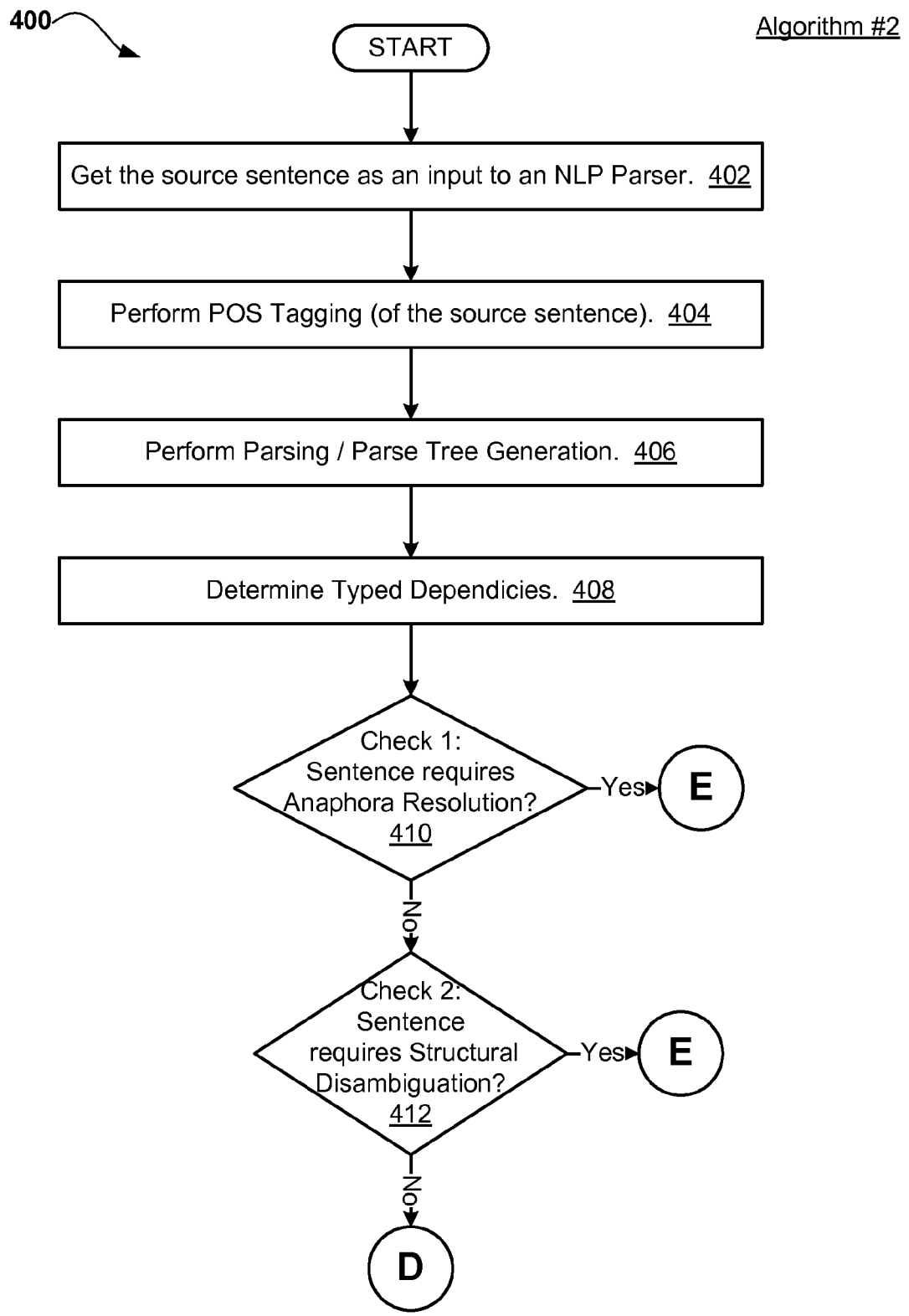
FIGS. 4A-4B is an operational flowchart illustrating an algorithm to check if a sentence is well-formed from a mathematical perspective according to one embodiment.
Figure 4B:
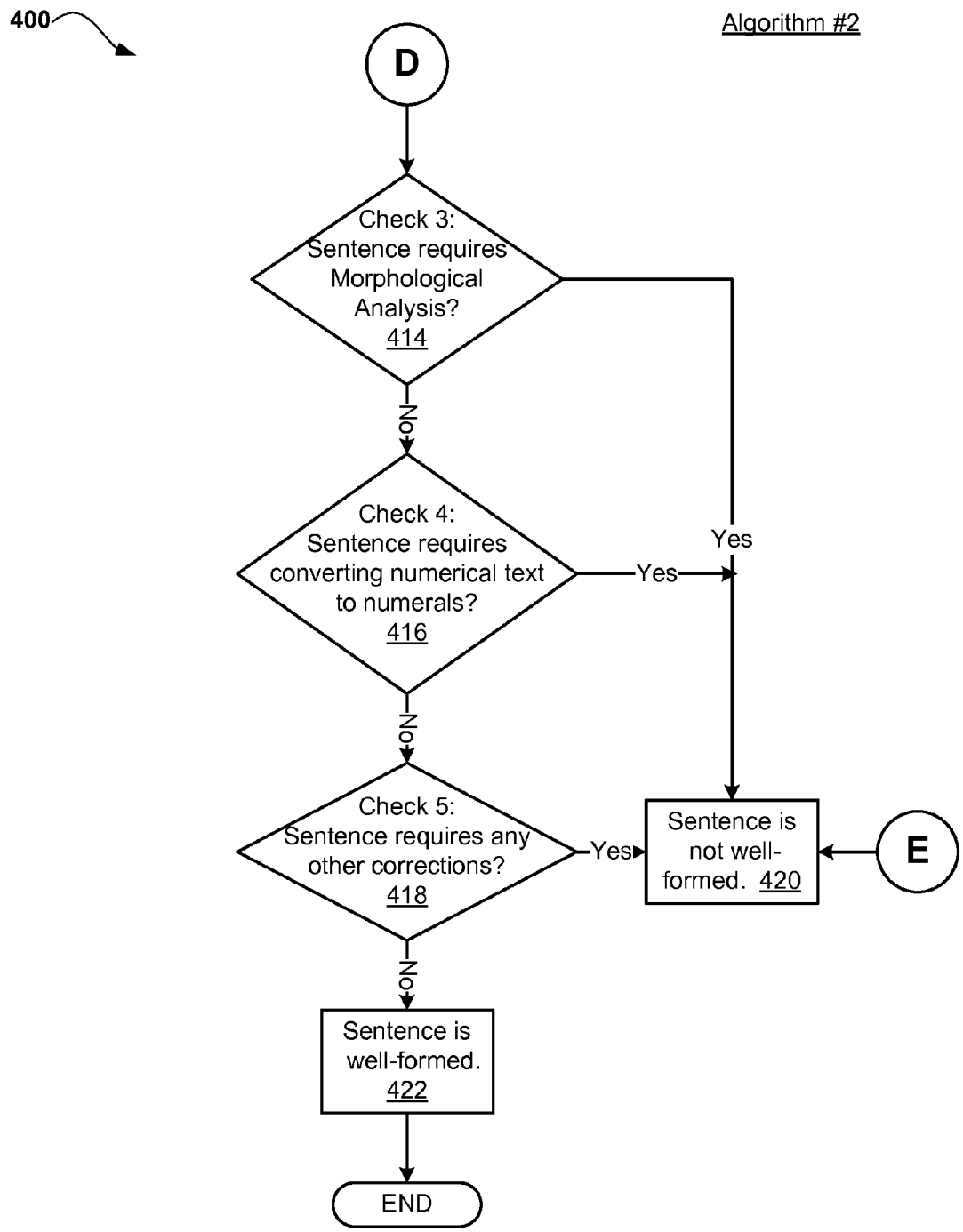

Referring now to FIGS. 4A-4B, an operational flowchart 400 illustrating an algorithm (i.e., algorithm #2) to check if a sentence is well-formed from a mathematical perspective in accordance with one embodiment is depicted. For example, a well-formed sentence may be a sentence such as, ("Ashish had 2 apples. Ashish gave 1 apple to Joy. How many apples are left with Ashish?").

At 402, the method may get the source sentence as input to a natural language processing (NLP) parser. Then at 404, part-of-speech (POS) tagging is performed on the source sentence. As described above, in corpus linguistics, part-of-speech Tagging (POS tagging or POST), also called grammatical tagging, is the process of marking up a word in a text (corpus) as corresponding to a particular part of speech, based on both its definition, as well as its context (i.e., relationship) with adjacent and related words in a phrase, sentence, or paragraph.

Next, at 406, parsing and parse tree generation are performed. As previously described, parsing or syntactic analysis is the process of analyzing a string of symbols, either in natural language or in computer languages, according to the rules of a formal grammar. Then at 408, typed dependencies are determined. As described above, the typed dependencies are a representation of grammatical relations between words in a sentence.

Next at 410, the method may perform check 1 to determine whether the sentence requires anaphora resolution. As previously explained, an anaphora is a type of expression whose reference depends upon another referential element. If at 410 it is determined that the sentence does require anaphora resolution, then the method may continue to step 420 where it is determined that the sentence is not well-formed. However, if at 410 it is determined that the sentence does not require anaphora resolution, then the method may continue to step 412.

Then at 412, the method may perform check 2 to determine whether the sentence requires structural disambiguation. As previously explained, when a reader can reasonably interpret the same sentence as having more than one possible structure, the text is equivocal and meets the definition of syntactic ambiguity. If at 412 it is determined that the sentence does requires structural disambiguation, then the method may continue to step 420 where it is determined that the sentence is not well-formed. However, if at 412 it is determined that the sentence does not require structural disambiguation, then the method may continue to step 414.

Next, at 414, the method may perform check 3 to determine whether the sentence requires morphological analysis. As previously explained, morphology is the identification, analysis and description of the structure of a given language's morphemes and other linguistic units, such as root words, affixes, parts of speech, intonation or stress, or implied context. If at 414 it is determined that the sentence does require morphological analysis, then the method may continue to step 420 where it is determined that the sentence is not well-formed. However, if at 414 it is determined that the sentence does not require morphological analysis, then the method may continue to step 416.

Then at 416, the method may perform check 4 to determine whether the sentence requires converting numerical text to numerals. If at 416 it is determined that the sentence does require converting numerical text to numerals, then the method may continue to step 420 where it is determined that the sentence is not well-formed. However, if at 416 it is determined that the sentence does not require converting numerical text to numerals, then the method may continue to step 418.

Then at 418, the method may perform check 5 to determine whether the sentence requires any other corrections. If at 418 it is determined that the sentence does require other corrections, then the method may continue to step 420 where it is determined that the sentence is not well-formed. However, if at 418 it is determined that the sentence does not require any other corrections, then the method may determine at step 422 that the sentence is well formed, and the method may end.

Figure 5A:
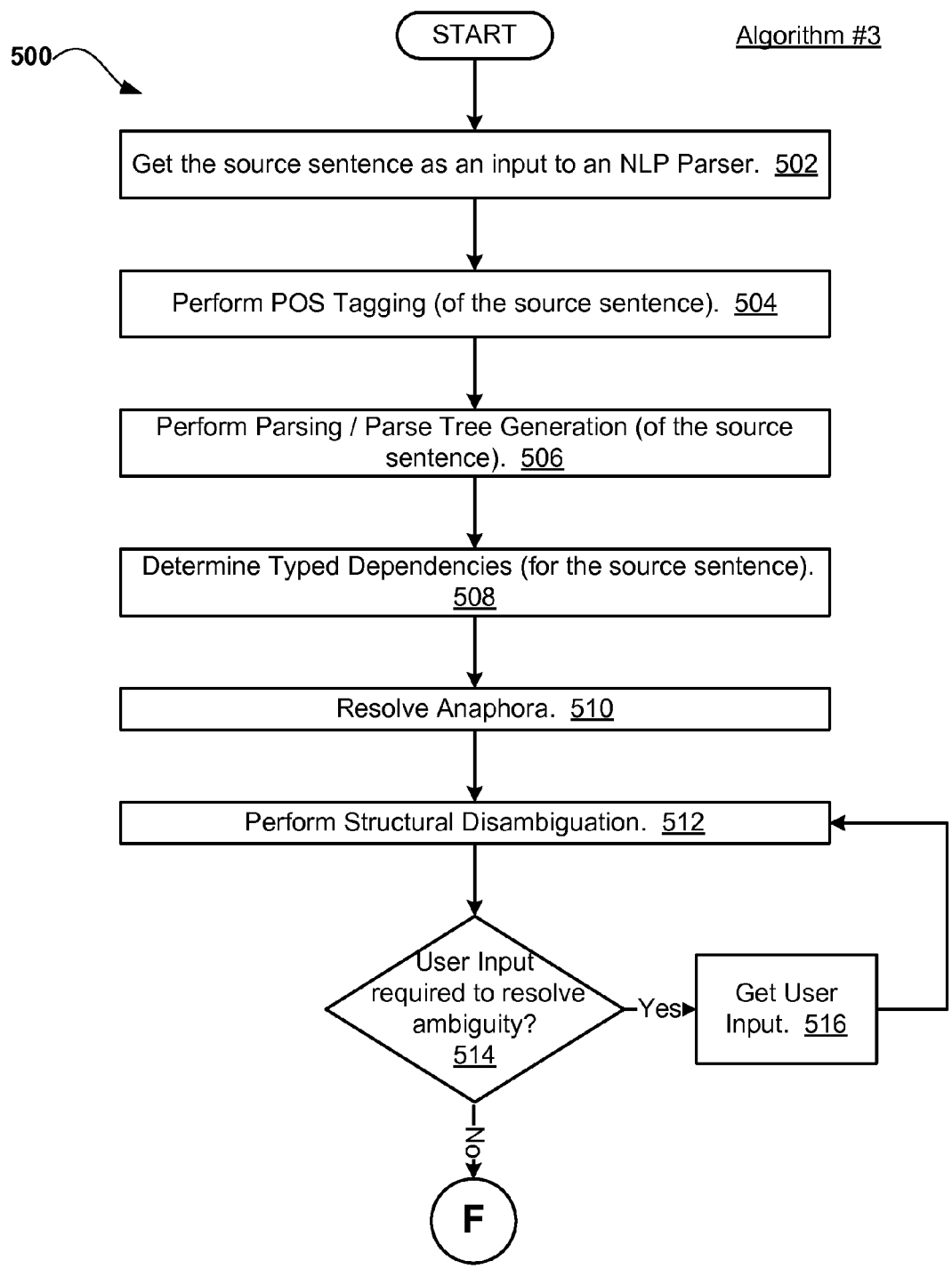
FIGS. 5A-5B is an operational flowchart illustrating an algorithm to convert a source sentence into a well-formed sentence (i.e., a target sentence) according to one embodiment.
Figure 5B:
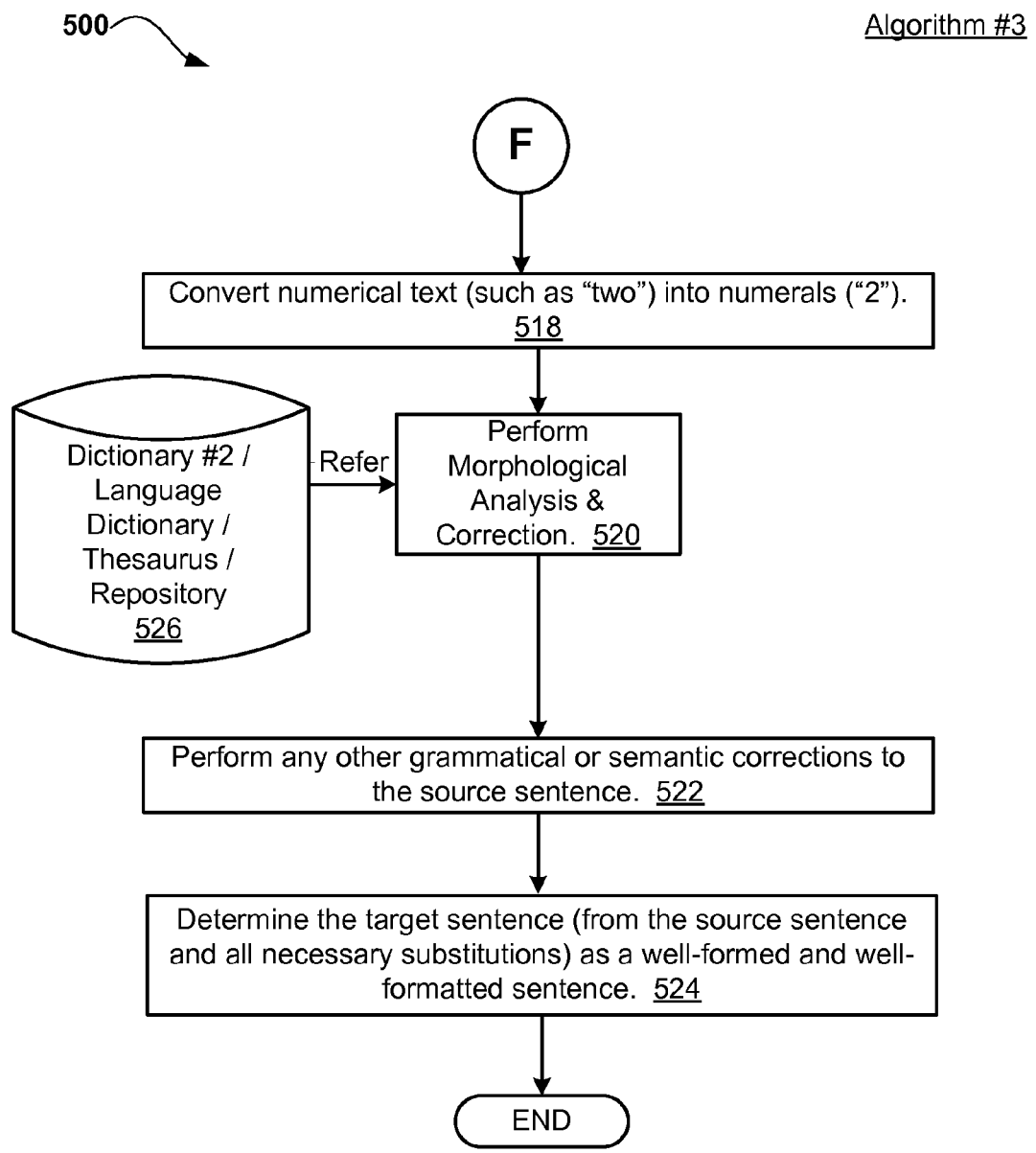

Referring now to FIGS. 5A-5B, an operational flowchart 500 illustrating an algorithm (i.e., algorithm #3) to convert a source sentence into a well-formed sentence (i.e., a target sentence) in accordance with one embodiment is depicted. At 502, the method may get the source sentence as input to a natural language processing (NLP) parser.

Then at 504, part-of-speech (POS) tagging (of the source sentence) is performed. As previously described, in corpus linguistics, part-of-speech Tagging (POS tagging or POST), also called grammatical tagging, is the process of marking up a word in a text (corpus) as corresponding to a particular part of speech, based on both its definition, as well as its context—i.e. relationship with adjacent and related words in a phrase, sentence, or paragraph.

Next at 506, parsing and parse tree generation (of the source sentence) are performed. As previously described, parsing or syntactic analysis is the process of analyzing a string of symbols, either in natural language or in computer languages, according to the rules of a formal grammar. Then at 508, typed dependencies (for the source sentence) are determined. As previously explained, the typed dependencies are a representation of grammatical relations between words in a sentence.

Next at 510, anaphora are resolved. As previously explained, an anaphora is a type of expression whose reference depends upon another referential element. Then at 512, structural disambiguation is performed. As previously explained, when a reader can reasonably interpret the same sentence as having more than one possible structure, the text is equivocal and meets the definition of syntactic ambiguity.

Next at 514, it is determined whether user input is required to resolve the ambiguity. If at 514 it is determined that user input is required to resolve the ambiguity, then at 516, the method may get the user input and continue back to step 512 to perform the structural disambiguation. However, if at 514, it is determined that user input is not required to resolve the ambiguity, then at 518, the method may convert numerical text into numerals. For example, the method may convert numerical text, such as "two" into the numeral "2".

Then at 520, morphological analysis and correction may be performed. As previously explained, morphology is the identification, analysis and description of the structure of a given language's morphemes and other linguistic units, such as root words, affixes, parts of speech, intonation or stress, or implied context. According to one implementation of the present embodiment, the morphological analysis and correction may be performed by referring to the Dictionary #2 (526) which is the language dictionary and thesaurus repository.

Next at 522, any other grammatical or semantic corrections to the source sentence may be performed. Then at 524, the method may determine the target sentence (from the source sentence and all necessary substitutions) as a well-formed and well-formatted sentence.

Figure 6A:
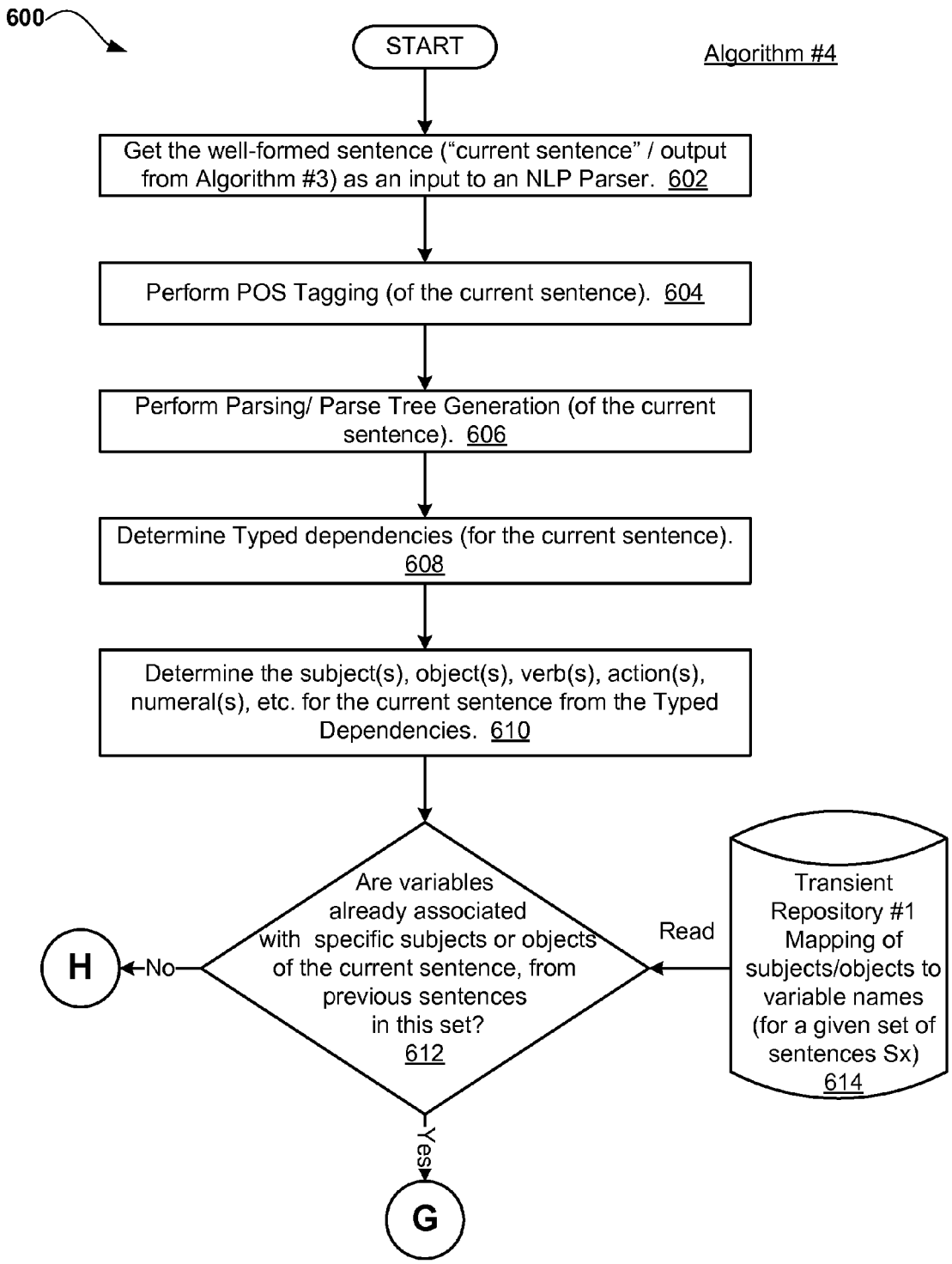
FIGS. 6A-6B is an operational flowchart illustrating an algorithm to convert a well-formed sentence into a mathematical equation according to one embodiment.
Figure 6B:
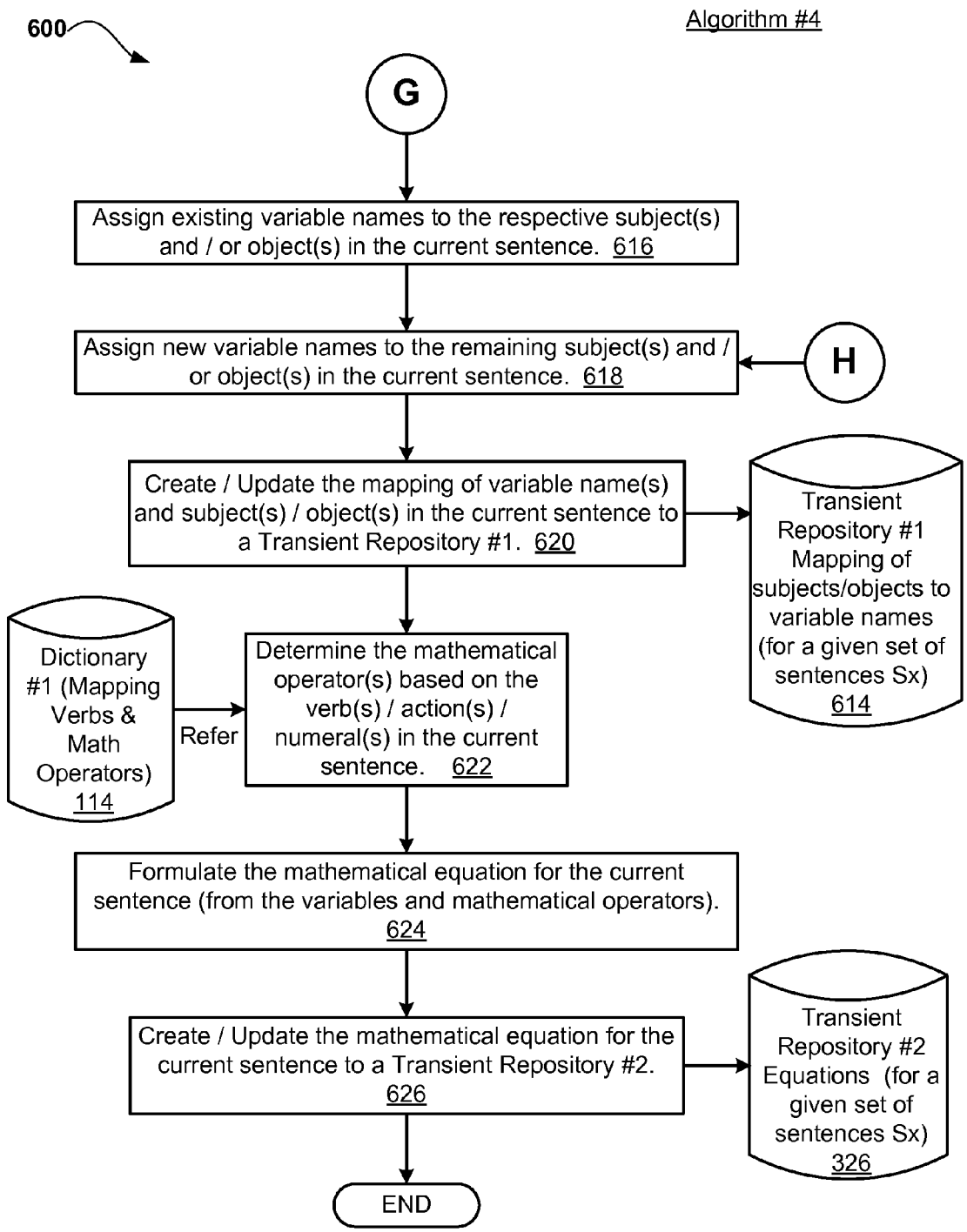

Referring now to FIGS. 6A-6B, an operational flowchart 600 illustrating an algorithm (i.e., algorithm #4) to convert a well-formed sentence into a mathematical equation in accordance with one embodiment is depicted. At 602, the method may get the well-formed sentence as an input to a natural language processing (NLP) parser. According to one implementation, the well-formed sentence may be the "current sentence" or the output form algorithm #3 previously described with respect to FIGS. 5A-5B.

Then at 604, the method may perform par-of-speech (POS) tagging of the current sentence. As previously described, in corpus linguistics, part-of-speech Tagging (POS tagging or POST), also called grammatical tagging, is the process of marking up a word in a text (corpus) as corresponding to a particular part of speech, based on both its definition, as well as its context (i.e., relationship) with adjacent and related words in a phrase, sentence, or paragraph.

Next at 606, the method may perform parsing and parse tree generation of the current sentence. As previously described, parsing or syntactic analysis is the process of analyzing a string of symbols, either in natural language or in computer languages, according to the rules of a formal grammar.

Then at 608 typed dependencies may be determined for the current sentence. As previously explained, the typed dependencies are a representation of grammatical relations between words in a sentence.

Next at 610, the subject(s), object(s), verb(s), action(s), numeral(s), etc. are determined for the current sentence from the typed dependencies. As previously explained, the typed dependencies are a representation of grammatical relations between words in a sentence.

Then at 612, it is determined whether the variables are already associated with specific subjects or objects of the current sentence, from previous sentences in this set. According to one implementation the determination as to whether the variables are already associated with specific subjects or objects of the current sentence, from previous sentences in this set may be made by reading the Transient Repository #1 (614) which is a repository of mapping of subjects or objects to variable names for a given set of sentences (Sx).

If at 612 it is determined that the variables are not already associated with specific subjects or objects of the current sentence, from previous sentences in this set, then the method may continue to step 618 to assign new variable names to the remaining subject(s) and/or object(s) in the current sentence. However, if at 612 it is determined that the variables are already associated with specific subjects or objects of the current sentence, from previous sentences in this set, then at 616, the method may assign existing variable names to the respective subject(s) and/or object(s) in the current sentence.

Next at 618, new variable names are assigned to the remaining subject(s) and/or object(s) in the current sentence. Then at 620, the method may create or update the mapping of the variable name(s) and subject(s) or object(s) in the current sentence to a Transient Repository #1 (614) which is a repository of mapping of subjects or objects to variable names for a given set of sentences (Sx).

Next at 622, the mathematical operator(s) are determined based on the verb(s), action(s), or numeral(s) in the current sentence. According to one implementation, the determination of the mathematical operator(s) may be made by referring to a Dictionary #1 (114) which maps verbs and math operators.

Then at 624, the mathematical equation for the current sentence (from the variables and mathematical operators) is formulated. Next at 626, the method may create or update the mathematical equation for the current sentence to a Transient Repository #2 (326) which is the repository of equations for a given set of sentences (Sx).

Figure 7:
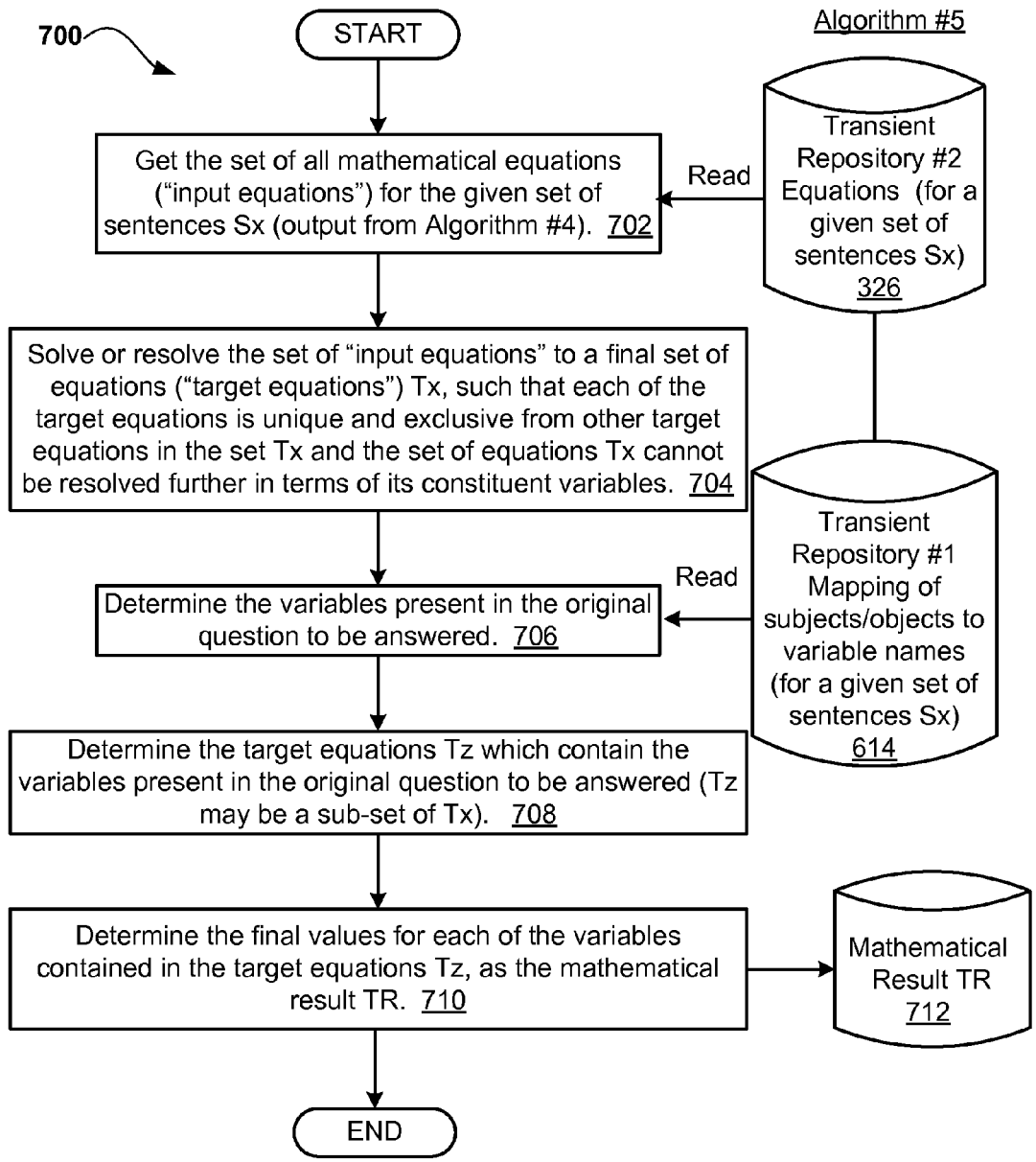
FIG. 7 is an operational flowchart illustrating an algorithm to solve a set of mathematical equations and return a result according to one embodiment.

Referring now to FIG. 7, an operational flowchart 700 illustrating an algorithm (i.e., algorithm #5) to solve a set of mathematical equations and return a result in accordance with one embodiment is depicted.

At 702, the method may get the set of all mathematical equations (i.e., "input equations") for the given set of sentences (Sx) which is the output from algorithm #4 (FIGS. 6A-6B) previously described. According to one implementation, the method may get the set of all mathematical equations (i.e., "input equations") for the given set of sentences (Sx) from a Transient Repository #2 (326) which is the repository of equations for a given set of sentences (Sx).

Then at 704, the method may solve or resolve the set of "input equations" to a final set of equations ("target equations") Tx, such that each of the target equations is unique and exclusive from other target equations in the set Tx and the set of equations Tx cannot be resolved further in terms of its constituent variables. According to the present embodiment, step 704 may be a generic step and as such, there may be many possible ways to implement this step regarding the solving of equations. For example, one implementation to perform the step regarding the solving of equations may be as follows:
(a) Take each "pair" of equations [A & B].
(b) Resolve all variables and mathematical operations for the given pair A & B to get a resultant equation C.
(c) Take resultant equation C and the next available equation X; Resolve C and X to get another resultant equation D; and so on until all the equations in the set of "input equations" are resolved to get the final set of target equation(s) Tx which cannot be resolved further in terms of variables.

Next at 706, the method may determine the variable present in the original question to be answered. According to one implementation, the method may determine the variable present in the original question to be answered by reading the Transient Repository #1 (614) which is a repository of mapping of subjects or objects to variable names for a given set of sentences (Sx).

Then at 708, the method may determine the target equations Tz which contain the variables present in the original question to be answered (Tz may be a sub-set of Tx). Next at 710, the method may determine the final values for each of the variables contained in the target equations Tz, as the Mathematical Result TR (712).

Figure 8:
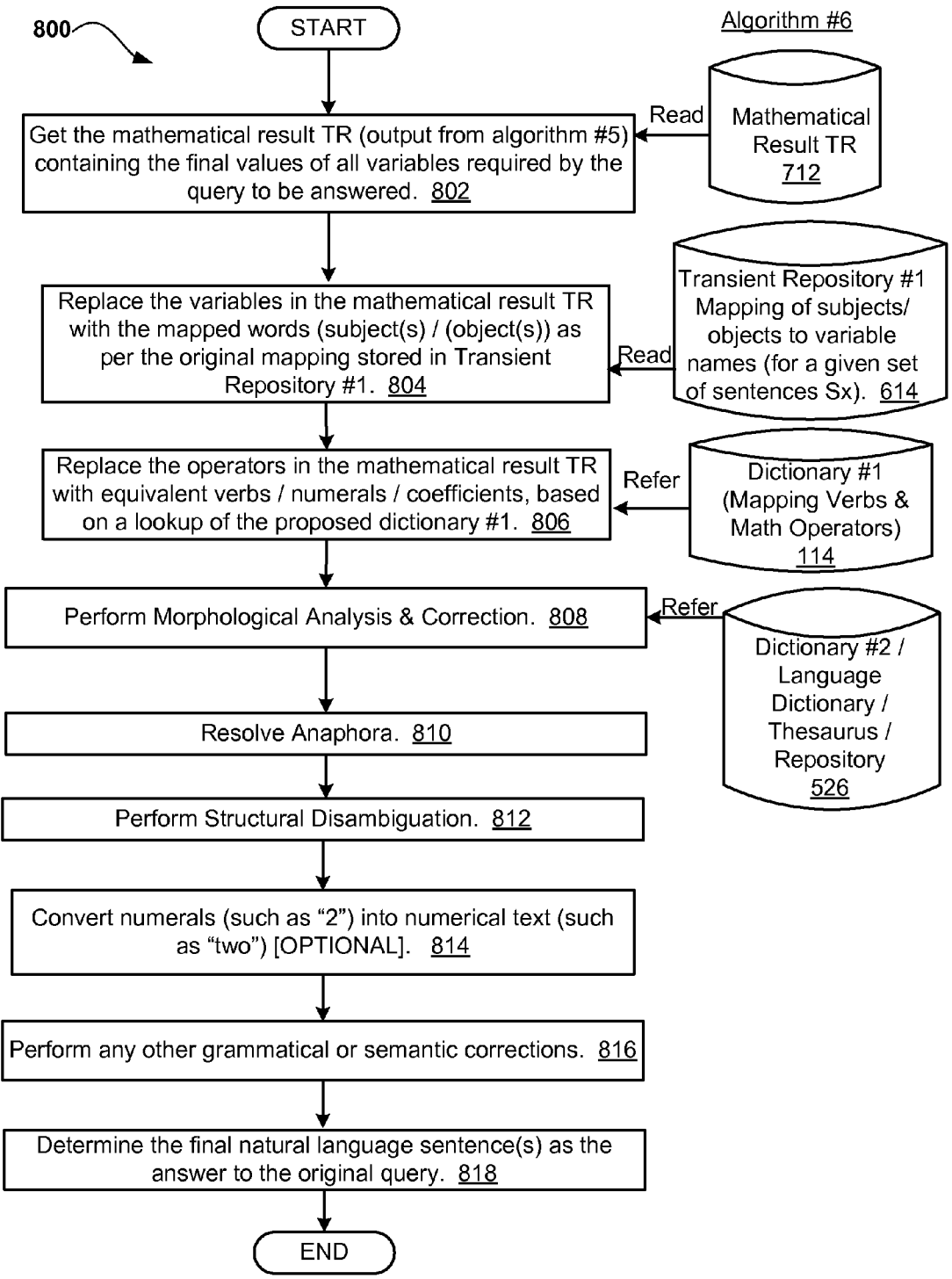
FIG. 8 is an operational flowchart illustrating an algorithm to narrate the mathematical equations in natural language according to one embodiment.

Referring now to FIG. 8, an operational flowchart 800 illustrating an algorithm (i.e., algorithm #6) to narrate the mathematical equations in natural language in accordance with one embodiment is depicted. At 802, the method may get the Mathematical Result TR 712 (output from algorithm #5 (FIG. 7)) containing the final values of all variables required by the query to be answered.

Then at 804, the method may replace the variables in the mathematical result TR with the mapped words (subject(s) or (object(s)) as per the original mapping stored in Transient (Repository #1) 614. As previously described, the Transient Repository #1 may include the mapping of subject or objects to variable names (for a given set of sentences Sx).

Next at 806, the method may replace the operators in the mathematical result TR with equivalent verbs, numerals, or coefficients based on a lookup of the proposed Dictionary #1 (114). As previously described, the Dictionary #1 may map verbs and math operators.

Then at 808, morphological analysis and correction may be performed. As previously explained, morphology is the identification, analysis and description of the structure of a given language's morphemes and other linguistic units, such as root words, affixes, parts of speech, intonation or stress, or implied context. According to one implementation of the present embodiment, the morphological analysis and correction may be performed by referring to the Dictionary #2 (526) which is the language dictionary and thesaurus repository.

Next at 810, the method may resolve anaphora. As explained above, an anaphora is a type of expression whose reference depends upon another referential element. Then at 812, the method may perform disambiguation. As previously described, when a reader can reasonably interpret the same sentence as having more than one possible structure, the text is equivocal and meets the definition of syntactic ambiguity.

Next at 814, numerals are converted into numerical text. For example, the method may convert a numeral, such as "2" into numerical text, such as "two". Then at 816, the method may perform any other grammatical or semantic corrections. Next at 818, the method may determine the final natural language sentence(s) as the answer to the original query.

Figure 9A:
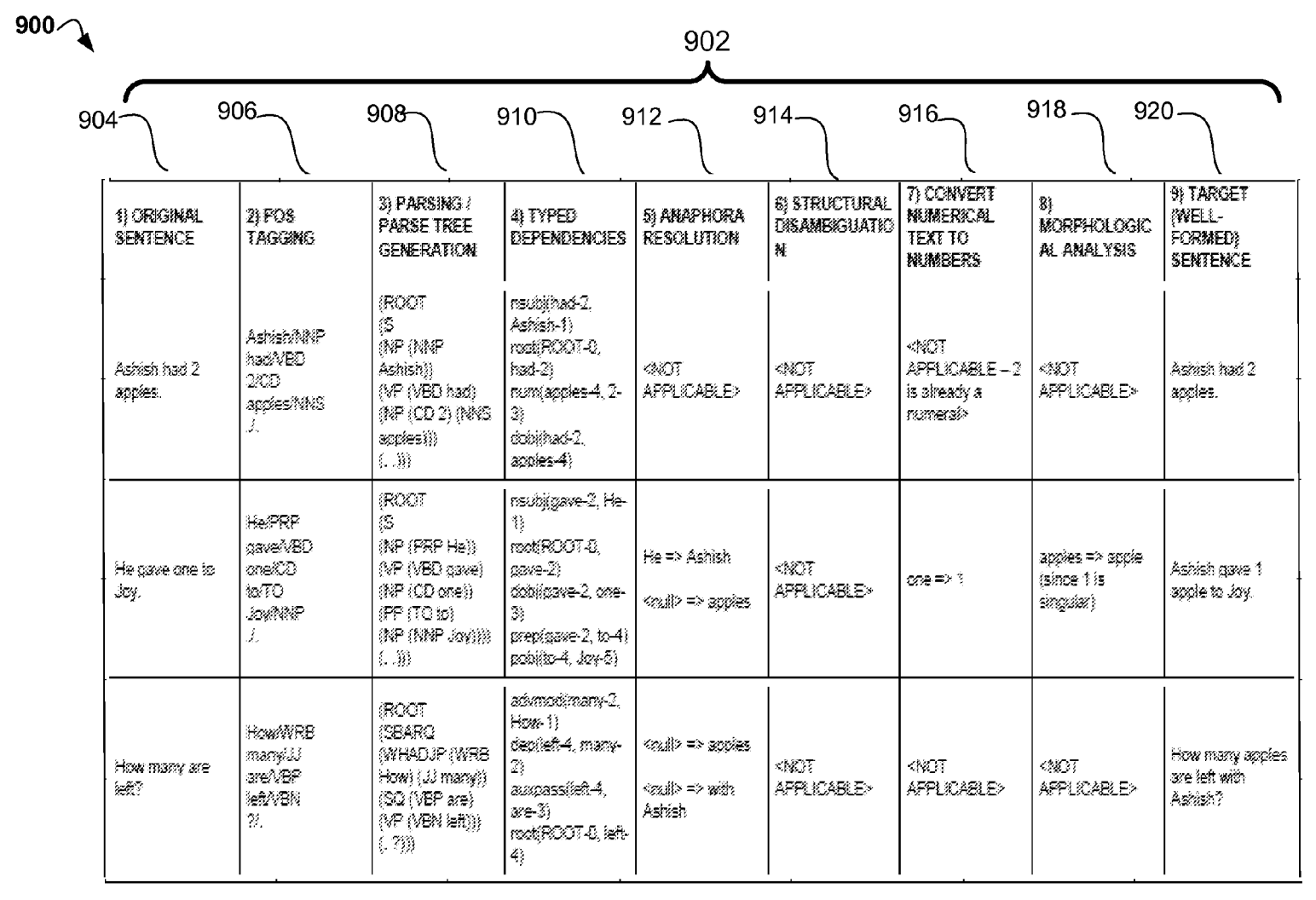

FIGS. 9A-9B illustrate examples solving a math problem 900 using the described algorithms in FIGS. 3-8 in accordance with one embodiment is depicted.

Problem Statement: Ashish had 2 apples. He gave one to Joy. How many are left?

Step #1 (904): Use algorithm #1 (FIG. 3) to get the input problem statement ("Ashish had 2 apples. He gave one to Joy. How many are left?").

Step #2 (906): Use algorithm #1 (FIG. 3) to determine if the query is the last sentence in the sequence (Result: YES).

Step #3 (908): Use algorithm #2 (FIG. 4) to check if the input sentences are well-formed from a mathematical perspective (Result: NO).

Step #4 (910): Use algorithm #3 (FIG. 5) to convert source sentences to well-formed sentences from a mathematical perspective as per Sub-Steps 1 thru 9 (902).
Output from Step #4 (910): Well-formed sentences ("Ashish had 2 apples. Ashish gave 1 apple to Joy. How many apples are left with Ashish?").

Step #5 (912): Use algorithm #4 (FIG. 6) to get the input well-formed sentences ("Ashish had 2 apples. Ashish gave 1 apple to Joy. How many apples are left with Ashish?").

Step #6 (914): Use algorithm #4 (FIG. 6) to perform POS tagging, parse tree generation and determining typed dependencies for the input sentences.

Step #7 (916): Use algorithm #4 (FIG. 6) to determine variables for subject(s), object(s), verb(s), numeral(s), etc. from the typed dependencies.

Step #8 (918): Use algorithm #4 (FIG. 6) to lookup proposed dictionary #1 to determine verb-operator mapping.

Step #9 (920): Use algorithm #4 (FIG. 6) to construct the relevant equations for the sentences (except for the actual question to be answered).
Output from Step #9 (920): Set of mathematical equations to be solved.

Step #10 (922): Use algorithm #5 (FIG. 7) to get the set of all mathematical equations ("input equations") for the given set of sentences (Sx).

$NSUBJ1 = 2*DOBJ1$      (Original Equation #1)

$NSUBJ1 = NSUBJ1 - 1*DOBJ1$      (Original Equation #2)

$POBJ1 = POBJ1 + 1*DOBJ1$      (Original Equation #3)

Step #11 (924): Use algorithm #5 (FIG. 7) to solve or resolve the set of "input equations" to a final set of equations ("target equations") Tx, such that each of the target equations is unique and exclusive from other target equations in the set Tx and the set of equations Tx cannot be resolved further in terms of its constituent variables.

$NSUBJ1 = 2*DOBJ1$      (Original Equation #1)

$NSUBJ1 = 2*DOBJ1 - 1*DOBJ1$
     (Substitute value of NSUBJ1 from Equation #1 into Equation #2)

$NSUBJ1 = 1*DOBJ1$      (Final Equation #2)

$POBJ1 = 0$      (Initialize value of POBJ1)

$POBJ1 = 0 + 1*DOBJ1$
     (Substitute initial value of POBJ1 into Equation #3)

$POBJ1 = 1*DOBJ1$      (Final Equation #3)

Step #12 (926): Use algorithm #5 (FIG. 7) to determine the variables present in the original question to be answered. From Step #7, it is determined that the Question (Math Problem) needs to be answered/solved in terms of NSUBJ1 and DOBJ1.

Step #13 (928): Using algorithm #5 (FIG. 7), from Step #11 and Step #12 above, it is determined that the final equation #2 gives the solution in terms of NSUBJ1 and DOBJ1, and is the mathematical result TR.

$NSUBJ1 = 1*DOBJ1$      (Mathematical Result TR)

Step #14 (930): Using algorithm #6, (FIG. 8) for the mathematical result TR, replace the variables with the mapped words (subject(s)/object(s)) to obtain the final mathematical result:

$NSUBJ1 = 1*DOBJ1$      (Result TR)

(Replaced variables with mapped words) Ashish=1*Apples

Step #15 (932): Using algorithm #6 (FIG. 8), replace the operators in the mathematical result TR with equivalent verbs/numerals/coefficients, based on a lookup of the proposed dictionary #1:

(Replaced operators "=" with "has" and "*" with <blank>) Ashish has 1 Apples

Step #16 (934): Using algorithm #6 (FIG. 8), perform morphological analysis, anaphora resolution, structural disambiguation and any other grammatical corrections as required to get the final answer to the original query:

(Morphological analysis+any other corrections to get final answer) Ashish has 1 apple left.

Figure 10:
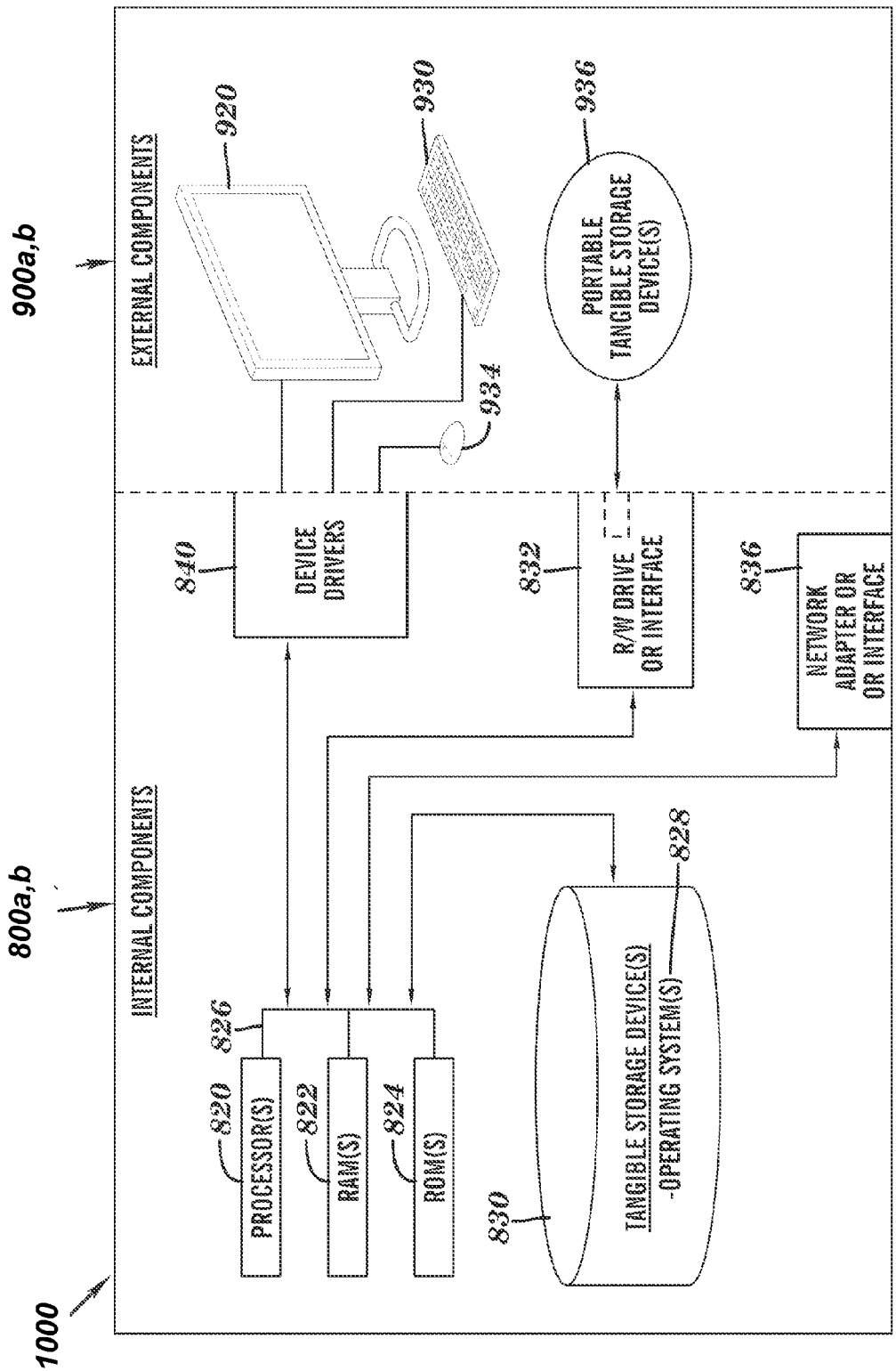
FIG. 10 is a block diagram of internal and external components of computers and servers depicted in FIG. 1 according to at least one embodiment.

FIG. 10 is a block diagram 1000 of internal and external components of computers depicted in FIG. 1 in accordance with an illustrative embodiment of the present invention. It should be appreciated that FIG. 10 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) may include respective sets of internal components 800 a, b and external components 900 a, b illustrated in FIG. 10 Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and Arithmetic and Algebraic Problem Solving Program 108A (FIG. 1) in client computer 102 (FIG. 1) and Arithmetic and Algebraic Problem Solving Program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 10, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as Arithmetic and Algebraic Problem Solving Program 108A and 108B (FIG. 1), can be stored on one or more of the respective portable computer-readable tangible storage devices 936, read via the respective R/W drive or interface 832 and loaded into the respective hard drive 830.

Each set of internal components 800 *a, b* also includes network adapters or interfaces 836 such as a TCP/IP adapter cards, wireless Wi-Fi interface cards, or 3G or 4G wireless interface cards or other wired or wireless communication links. The Arithmetic and Algebraic Problem Solving Program 108A (FIG. 1) in client computer 102 (FIG. 1) and Arithmetic and Algebraic Problem Solving Program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the Arithmetic and Algebraic Problem Solving Program 108A (FIG. 1) in client computer 102 (FIG. 1) and the Arithmetic and Algebraic Problem Solving Program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 900 *a, b* can include a computer display monitor 920, a keyboard 930, and a computer mouse 934. External components 900 *a, b* can also include touch screens, virtual keyboards, touch pads, pointing devices, and other human interface devices. Each of the sets of internal components 800 *a, b* also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for solving and answering an arithmetic or algebraic problem through a computer-based question-answer system in real-time, using natural language processing (NLP) and an online dictionary, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

creating and maintaining the online dictionary, wherein creating and maintaining the online dictionary comprises:

determining a relationship between at least one verb and at least one math operator;

mapping the at least one verb to at least one math operator based on the determined relationship;

storing the mapped at least one verb to the at least one math operator in the online dictionary;

identifying an effect of the stored at least one math operator on a plurality of subjects;

identifying an effect of the stored at least one math operator on a plurality of objects;

correlating the identified effect of the stored at least one math operator to the plurality of subjects;

correlating the identified effect of the at least one math operator to the plurality of objects;

updating the online dictionary with the correlated identified effect of the at least one math operator to the plurality of subjects; and updating the online dictionary with the correlated identified effect of the at least one math operator to the plurality of objects;

receiving, by a processor associated with a first computer, an input statement, wherein the input statement is a geometric word problem that includes a plurality of geometric figures, angles, perimeters, and areas described by a plurality of words, entered by a user in natural language without a mathematical operator symbol, via a user interface associated with a computing system;

determining whether each sentence within a plurality of sentences associated with the input statement is a well-formed sentence from a mathematical perspective, wherein determining whether each sentence within the plurality of sentences associated with the input statement is a well-formed sentence from a mathematical perspective comprises:

performing part-of-speech (POS) tagging and parsing or parse tree generation on each sentence within the plurality of sentences; and determining a typed dependency for each sentence within in the plurality of sentences and if each sentence within the plurality of sentences requires anaphora resolution;

converting each statement into a well-formed sentence based on the determining whether each sentence within a plurality of sentences associated with the input statement is a well-formed sentence from a mathematical perspective, wherein converting each statement into a well-formed sentence comprises:

performing part-of-speech (POS) tagging and parsing or parse tree generation on each sentence within the plurality of sentences; and determining if a plurality of user input is required to resolve a plurality of ambiguity associated with at least one sentence within the plurality of sentences;

in response to determining the plurality of user input is required to resolve the plurality of ambiguity, prompting the user for the plurality of input to resolve the plurality of ambiguity; and in response to receiving the plurality of user input, performing structural disambiguation for each sentence within the plurality of sentences;

converting each well-formed sentence into a mathematical equation to form a set of equations, wherein forming the set of equations comprises receiving the plurality of input entered by the user and storing each mathematical equation in an online repository, wherein the converting the well-formed sentence into the mathematical equation and solving the set of equations comprises communicating online with a second computer to access the online dictionary containing a mapping between a plurality of verbs, a plurality of action words, and a plurality of mathematical operators, wherein the dictionary is created, updated, and maintained separately on a server, and wherein the dictionary specifies for each verb within the plurality of verbs or each action word within the plurality of action words, the effect of the plurality of at least one mathematical operator within the plurality of mathematical operators on an operand of a sentence and wherein the converting the well-formed sentence into the mathematical equation and solving the set of equations further comprises determining the effect of the plurality of at least one mathematical operator within the plurality of mathematical operators on the operand of the sentence based on electronically reading the dictionary and determining for each verb within the plurality of verbs or each action word within the plurality of action words, the effect of the plurality of the at least one mathematical operator within the plurality of mathematical operators on the operand of the sentence and performing a plurality of online-computing techniques, wherein the plurality of online computing techniques comprises performing part-of-speech (POS) tagging, performing parsing or parse tree generation, determining a typed dependency, and determining a subject, an object, a verb, an action, and a numeral from the typed dependency;

retrieving the formed set of equations from the online repository;

solving the retrieved set of equations to compute a mathematical result; and narrating the mathematical result in natural language, wherein the mathematical result is narrated as an automatic interactive response or a solution from the computer system in real-time and comprises converting the mathematical result into at least one natural language sentence.

2. The computer system of claim 1, wherein the solving the set of equations comprises a transient repository containing equations for a given set of sentences.

3. The computer system of claim 1, wherein determining the typed dependencies comprises at least one of determining whether the sentence requires at least one of an anaphora resolution; a structural disambiguation; a morphological analysis; and a conversion of numerical text to a numeral.

4. The computer system of claim 1, wherein performing morphological analysis and correction comprises a dictionary containing a language dictionary and a thesaurus repository.

5. The computer system of claim 1, wherein the determining a subject, an object, a verb, an action, and a numeral from the typed dependency comprises a transient repository containing a mapping of a subject or an object to a variable name.

6. A computer program product for solving and answering an arithmetic or algebraic problem through a computer-based question-answer system in real-time, using natural language processing (NLP) and an online dictionary, the computer program product comprising:

one or more computer-readable storage devices and program instructions stored on at least one of the one or more tangible storage devices, the program instructions executable by a processor, the program instructions comprising:

program instructions to create and maintain the online dictionary, wherein creating and maintaining the online dictionary comprises:

program instructions to determine a relationship between at least one verb and at least one math operator;

program instructions to map the at least one verb to at least one math operator based on the determined relationship;

program instructions to store the mapped at least one verb to the at least one math operator in the online dictionary;

program instructions to identify an effect of the stored at least one math operator on a plurality of subjects;

program instructions to identify an effect of the stored at least one math operator on a plurality of objects;

program instructions to correlate the identified effect of the stored at least one math operator to the plurality of subjects;

program instructions to correlate the identified effect of the at least one math operator to the plurality of objects;

program instructions to update the online dictionary with the correlated identified effect of the at least one math operator to the plurality of subjects; and program instructions to update the online dictionary with the correlated identified effect of the at least one math operator to the plurality of objects;

program instructions to receive, by a processor associated with a first computer, an input statement, wherein the input statement is a geometric word problem that includes a plurality of geometric figures, angles, perimeters, and areas described by a plurality of words, entered by a user in natural language without a mathematical operator symbol, via a user interface associated with a computing system;

program instructions to determine whether each sentence within a plurality of sentences associated with the input statement is a well-formed sentence from a mathematical perspective, wherein determining whether each sentence within the plurality of sentences associated with the input statement is a well-formed sentence from a mathematical perspective comprises:

program instructions to perform part-of-speech (POS) tagging and parsing or parse tree generation on each sentence within the plurality of sentences; and program instructions to determine a typed dependency for each sentence within in the plurality of sentences and if each sentence within the plurality of sentences requires anaphora resolution;

program instructions to convert each statement into a well-formed sentence based on the determining whether each sentence within a plurality of sentences associated with the input statement is a well-formed sentence from a mathematical perspective, wherein converting each statement into a well-formed sentence comprises:

program instructions to perform part-of-speech (POS) tagging and parsing or parse tree generation on each sentence within the plurality of sentences; and program instructions to determine if a plurality of user input is required to resolve a plurality of ambiguity associated with at least one sentence within the plurality of sentences;

in response to determining the plurality of user input is required to resolve the plurality of ambiguity, program instructions to prompt the user for the plurality of input to resolve the plurality of ambiguity; and in response to receiving the plurality of user input, program instructions to perform structural disambiguation for each sentence within the plurality of sentences;

program instructions to convert each well-formed sentence into a mathematical equation to form a set of equations, wherein forming the set of equations comprises receiving the plurality of input entered by the user and storing each mathematical equation in an online repository, wherein the converting the well-formed sentence into the mathematical equation and solving the set of equations comprises communicating online with a second computer to access the online dictionary containing a mapping between a plurality of verbs, a plurality of action words, and a plurality of mathematical operators, wherein the dictionary is created, updated, and maintained separately on a server, and wherein the dictionary specifies for each verb within the plurality of verbs or each action word within the plurality of action words, the effect of the plurality of at least one mathematical operator within the plurality of mathematical operators on an operand of a sentence and wherein the converting the well-formed sentence into the mathematical equation and solving the set of equations further comprises determining the effect of the plurality of at least one mathematical operator within the plurality of mathematical operators on the operand of the sentence based on electronically reading the dictionary and determining for each verb within the plurality of verbs or each action word within the plurality of action words, the effect of the plurality of the at least one mathematical operator within the plurality of mathematical operators on the operand of the sentence and performing a plurality of online-computing techniques, wherein the plurality of online computing techniques comprises performing part-of-speech (POS) tagging, performing parsing or parse tree generation, determining a typed dependency, and determining a subject, an object, a verb, an action, and a numeral from the typed dependency;

program instructions to retrieve the formed set of equations from the online repository;

program instructions to solve the retrieved set of equations to compute a mathematical result; and program instructions to narrate the mathematical result in natural language, wherein the mathematical result is narrated as an automatic interactive response or a solution from the computer system in real-time and comprises converting the mathematical result into at least one natural language sentence.

* * * * *